(12) United States Patent
Inagaki et al.

(10) Patent No.: US 9,638,885 B2
(45) Date of Patent: May 2, 2017

(54) LENS DRIVING APPARATUS

(71) Applicant: ALPS ELECTRIC CO., LTD., Tokyo (JP)

(72) Inventors: Yasushi Inagaki, Miyagi-ken (JP); Katsuhiko Otomo, Miyagi-ken (JP)

(73) Assignee: ALPS ELECTRIC CO., LTD., Tokyo (JP)

( * ) Notice: Subject to any disclaimer, the term of this patent is extended or adjusted under 35 U.S.C. 154(b) by 91 days.

(21) Appl. No.: 14/605,722

(22) Filed: Jan. 26, 2015

(65) Prior Publication Data

US 2015/0212288 A1    Jul. 30, 2015

(30) Foreign Application Priority Data

Jan. 29, 2014  (JP) .................................. 2014-014553

(51) Int. Cl.
*G02B 7/02* (2006.01)
*G02B 7/08* (2006.01)

(52) U.S. Cl.
CPC ............... *G02B 7/025* (2013.01); *G02B 7/08* (2013.01)

(58) Field of Classification Search
CPC .......... G02B 7/023; G02B 7/04; G03B 17/02; G03B 3/02
USPC ................................................ 359/822–826
See application file for complete search history.

(56) References Cited

U.S. PATENT DOCUMENTS

| | | | | |
|---|---|---|---|---|
| 6,097,552 A | * | 8/2000 | Gordon | ..................... B41J 2/442 |
| | | | | 359/813 |
| 7,848,034 B2 | * | 12/2010 | Wang | .................. H02K 41/0356 |
| | | | | 359/819 |
| 2011/0075280 A1 | * | 3/2011 | Chou | ........................ G02B 7/08 |
| | | | | 359/824 |

FOREIGN PATENT DOCUMENTS

JP          3183101 U       4/2013

* cited by examiner

*Primary Examiner* — Scott J Sugarman
*Assistant Examiner* — Vipin Patel
(74) *Attorney, Agent, or Firm* — Beyer Law Group LLP

(57) ABSTRACT

A lens driving apparatus includes a lens holding member, a static member including a housing, a biasing member, and a moving mechanism. The biasing member includes upper and lower leaf springs. The upper leaf spring includes an upper first portion, an upper second portion, and an upper elastic arm portion. A through hole is formed in the upper first portion of the upper leaf spring. The lens holding member includes a fastening portion that includes a mount surface on which the upper leaf spring is placed, a recess facing the through hole, and a protrusion inserted into the through hole. An adhesive held in the recess surrounds the protrusion and part of the adhesive spreads to an upper surface of the upper first portion of the upper leaf spring through the through hole. The upper leaf spring is fixed to the lens holding member with the adhesive.

12 Claims, 18 Drawing Sheets

FIG. 18
FIG. 19
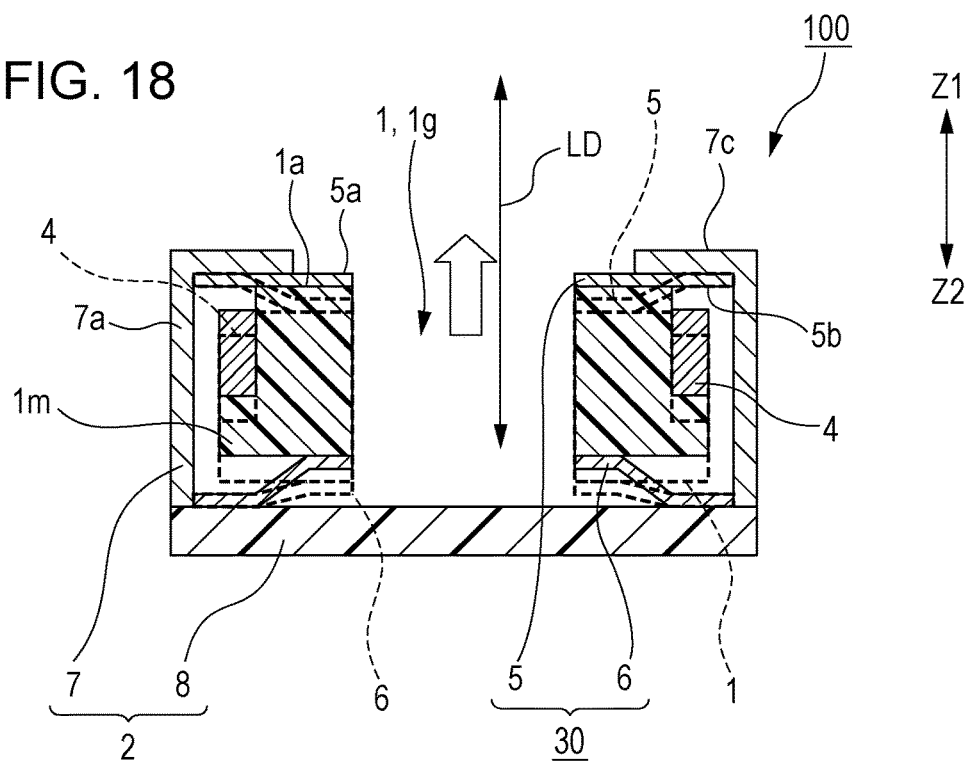
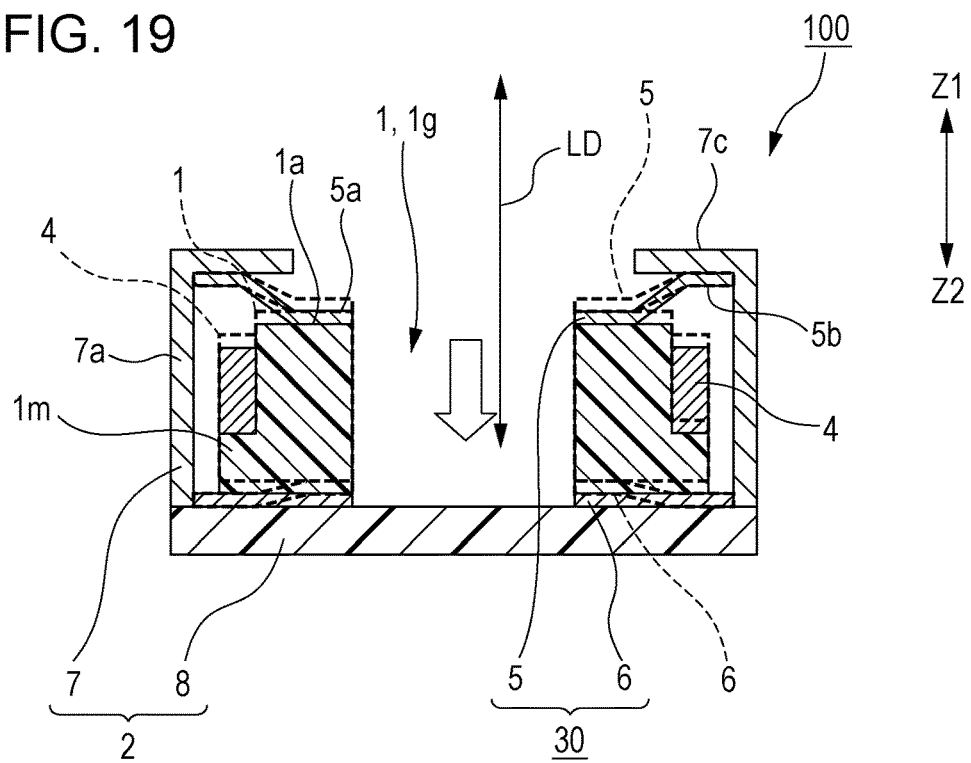

ND DRIVING APPARATUS

LENS DRIVING APPARATUS

CLAIM OF PRIORITY

This application claims benefit of Japanese Patent Application No. 2014-014553 filed on Jan. 29, 2014, which is hereby incorporated by reference.

BACKGROUND OF THE INVENTION

1. Field of the Invention

The present invention relates to lens driving apparatuses and particularly to a lens driving apparatus in which an upper leaf spring and a lens holding member are bonded together.

2. Description of the Related Art

These days, a large number of portable devices include a function with which still or moving images are taken. Such portable devices include a lens driving apparatus that drives a lens body to automatically focus on a target image during image capturing of a subject. Examples known as a lens driving apparatus used in a portable device include a lens driving apparatus described in Japanese Registered Utility Model No. 3183101.

Referring now to FIG. 20, the lens driving apparatus described in Japanese Registered Utility Model No. 3183101 is described below. FIG. 20 is an exploded perspective view of the configuration of a lens driving apparatus 900 described in Japanese Registered Utility Model No. 3183101.

The lens driving apparatus 900 described in Japanese Registered Utility Model No. 3183101 includes a lens holding member 912 that can hold a lens body, biasing members that support the lens holding member 912 in such a manner as to allow the lens holding member 912 to move in an optical axis direction, a fastening member 911 that fastens part of the biasing members, and a moving mechanism 910 that includes magnets 915, a coil 913, and a yoke 914. The biasing members are constituted by an upper leaf spring 916 and a lower leaf spring 917. The coil 913 is wound around the lens holding member 912. When an electrical current is caused to pass through the coil 913 disposed in a magnetic field of the magnets 915, an electromagnetic force acts on the coil 913 in a predetermined direction. The electromagnetic force acting on the coil 913 moves the lens holding member 912 around which the coil 913 is wound. Such a movement of the lens holding member 912 allows a portable device including the lens driving apparatus 900 to focus on a target image. The lens driving apparatus 900 holds the lens holding member 912 in a neutral position in an initial state using the upper leaf spring 916 and the lower leaf spring 917.

In the lens driving apparatus 900 described in Japanese Registered Utility Model No. 3183101, the upper leaf spring 916 biases the lens holding member 912 upward and the lower leaf spring 917 biases the lens holding member 912 downward in order to hold the lens holding member 912 in a neutral position in the initial state. The upper leaf spring 916 and the lens holding member 912 are fixed to each other by being bonded together. Thus, when the lens driving apparatus 900 receives an impact in a case, for example, where it is dropped by mistake, the adhesive used for joining the upper leaf spring 916 and the lens holding member 912 together may come off.

SUMMARY OF THE INVENTION

To address the above-described problem, the present invention provides a lens driving apparatus in which an adhesive used for joining an upper leaf spring and a lens holding member together is less likely to come off.

A lens driving apparatus according to an aspect of the present invention includes a tubular lens holding member that is capable of holding a lens body, a static member including a housing that accommodates the lens holding member therein, a biasing member that supports the lens holding member so as to allow the lens holding member to move in an optical axis direction, and a moving mechanism that at least includes a magnet and a coil and moves the lens holding member in the optical axis direction. The biasing member includes an upper leaf spring, fixed to an upper portion of the lens holding member, and a lower leaf spring, fixed to a lower portion of the lens holding member. The upper leaf spring includes a first portion fixed to the lens holding member, a second portion fixed to the static member, and an elastic arm portion positioned between the first portion and the second portion. A through hole is formed in the first portion of the upper leaf spring. The lens holding member includes a fastening portion. The fastening portion includes a mount surface on which the upper leaf spring is placed, an adhesive holding portion that faces the through hole, and a protrusion that protrudes from the adhesive holding portion and is inserted into the through hole. An adhesive held in the adhesive holding portion surrounds the protrusion and part of the adhesive spreads to an upper surface of the first portion of the upper leaf spring through the through hole, so that the upper leaf spring is fixed to the lens holding member with the adhesive.

In this structure, the adhesive held in the adhesive holding portion spreads to an upper surface of the first portion of the upper leaf spring through the through hole. The upper leaf spring can thus be fixed to the lens holding member in such a manner as to be pressed from the upper surface with the adhesive. This structure minimizes the chance of separation of an adhesive between the upper leaf spring and the lens holding member regardless of an impact being exerted on the lens driving apparatus due to a fall or other causes. The fastening portion of the lens holding member includes the protrusion, which is inserted into the through hole. Thus, the protrusion can hold the adhesive surrounding the protrusion, whereby the adhesive easily spreads to a portion on the upper surface of the first portion. This structure thus can provide a lens driving apparatus that minimizes the chance of separation of an adhesive between an upper leaf spring and a lens holding member.

In a lens driving apparatus according to another aspect of the present invention, the adhesive holding portion may be a recess that is recessed with respect to the mount surface and filled with the adhesive, and the adhesive may be disposed over and under a portion of the first portion, so that the upper leaf spring is fixed to the lens holding member.

In this structure, the upper leaf spring is bonded to the lens holding member with the adhesive with which the recess is filled and the adhesive that has spread to the upper surface of the first portion of the upper leaf spring through the through hole. Since the lower surface of the upper leaf spring, the inner surface of the through hole, and the upper surface of the upper leaf spring are held with the adhesive, the upper leaf spring can be more securely fixed to the lens holding member with the adhesive.

In a lens driving apparatus according to another aspect of the present invention, the through hole may be noncircular.

Compared to a circular through hole, the noncircular through hole can increase an area over which the adhesive spreads to bond the upper leaf spring to the lens holding member. The noncircular through hole thus can more firmly bond and fix the upper leaf spring to the lens holding member.

In a lens driving apparatus according to another aspect of the present invention, the lens holding member may include a rising base portion that includes the fastening portion. A boundary between the first portion and the elastic arm portion of the upper leaf spring may be located at a position corresponding to an outer periphery of the base portion.

In this structure, the boundary between the first portion and the elastic arm portion of the upper leaf spring is located at a position corresponding to the outer periphery of the base portion. This structure is thus more likely to prevent the elastic arm portion from coming into contact with the base portion when the elastic arm portion is in operation, thereby loosening the restriction on the operation of the elastic arm portion. Thus, the upper elastic arm portion can become fully operable. This structure enables production of the biasing force that varies to a lesser extent and can provide a lens driving apparatus that operates stably.

In a lens driving apparatus according to another aspect of the present invention, the recess may include an extension portion that extends toward the elastic arm portion and the through hole may include a fringe portion that faces the extension portion. The adhesive with which the extension portion is filled may be disposed over and under a portion of the first portion extending along the fringe portion.

In this structure, the recess includes the extension portion and the through hole includes the fringe portion that faces the extension portion. When the fringe portion of the through hole is disposed so as to overlap part of the extension portion filled with the adhesive, the adhesive squeezed by the first portion located near the fringe portion easily flows out to the upper surface of the first portion including the fringe portion. In addition, the provision of the fringe portion facing the extension portion can increase the area over which the adhesive spreads to bond the upper leaf spring to the lens holding member. Specifically, the first portion can increase an area over which the adhesive spreads to bond the upper leaf spring to the lens holding member and the upper surface and the lower surface of the first portion are held with the adhesive. Thus, the end portion of the first portion can be securely joined to the fastening portion of the lens holding member and thus the base portion of the elastic arm portion is fixed. This structure prevents the first portion from rising in accordance with the operation of the upper elastic arm portion, whereby the biasing force can be prevented from varying due to the rise of the first portion. This structure thus enables production of a biasing force that varies to a lesser extent and can provide a lens driving apparatus that operates more stably.

In a lens driving apparatus according to another aspect of the present invention, in an initial state where an electrical current is not caused to pass through the coil, the upper leaf spring may bias the lens holding member upward whereas the lower leaf spring may bias the lens holding member downward.

In this structure, in the initial state, the lens holding member is held at a position at which the biasing force of the upper leaf spring and the biasing force of the lower leaf spring are in balance. Since the lens holding member is held in this manner, the lens holding member is movable in positive and negative optical axis directions from the position at which the lens holding member is held in the initial state. Thus, when images are taken using an electronic device including the lens driving apparatus, the device can focus on a subject by moving the lens holding member by a minimum amount from the position at which it is held in the initial state.

The present invention can provide a lens driving apparatus in which an adhesive used for joining an upper leaf spring and a lens holding member together is less likely to come off.

BRIEF DESCRIPTION OF THE DRAWINGS

FIG. 2A is a perspective view of the appearance of the lens driving apparatus and FIG. 2B is a plan view of the lens driving apparatus when viewed from the Z1 side illustrated in FIG. 2A;

FIG. 3A is a perspective view of the appearance of the lens holding member and FIG. 3B is a perspective view of the appearance of the lens holding member when viewed from the Z2 side illustrated in FIG. 3A;

FIG. 4A is an enlarged perspective view of the portion IVA illustrated in FIG. 3A and FIG. 4B is a plan view of the portion IVA when viewed from the Z1 side illustrated in FIG. 4A;

FIG. 5A is a perspective view of the coil in the state of being held by the lens holding member, FIG. 5B is a perspective view of the coil in the state of being held by the lens holding member when viewed from the Z2 side illustrated in FIG. 5A, FIG. 5C is an enlarged perspective view of a portion VC illustrated in FIG. 5B;

FIG. 6A is a perspective view of an appearance of the upper leaf spring and FIG. 6B is an enlarged plan view of a portion VIB illustrated in FIG. 6A when viewed from the Z1 side;

FIG. 7A is a perspective view of an appearance of the lower leaf springs and FIG. 7B is a plan view of the lower leaf springs when viewed from the Z1 side illustrated in FIG. 7A;

FIG. 8A is a perspective view of an appearance of the housing and FIG. 8B is a plan view of the housing when viewed from the Z2 side illustrated in FIG. 8A;

FIG. 11A is a plan view of the lens holding member and the lower leaf spring in the state of being fixed to each other and FIG. 11B is a schematic side view of a portion XIB illustrated in FIG. 11A when viewed from the X1 side;

FIG. 14A is a plan view of the upper first portion placed on the mount surface and FIG. 14B is a side view of the upper first portion placed on the mount surface when viewed from the X1 side illustrated in FIG. 14A;

FIG. 15A is a perspective view of the upper first portion in the state of being joined to the mount surface and FIG. 15B is a plan view of the upper first portion joined to the mount surface when viewed from the Z1 side illustrated in FIG. 15A;

FIG. 18 is a schematic cross-sectional view of the lens driving apparatus taken along the line X-X, XVIII-XVIII, XIX-XIX in FIG. 2B in the state where the lens holding member according to the first embodiment has been moved upward;

FIG. 19 is a schematic cross-sectional view of the lens driving apparatus taken along the line X-X, XVIII-XVIII, XIX-XIX in FIG. 2B in the state where the lens holding member according to the first embodiment has been moved downward.

DESCRIPTION OF THE PREFERRED EMBODIMENTS

First Embodiment

A lens driving apparatus 100 according to a first embodiment is described below.

Figure 1:
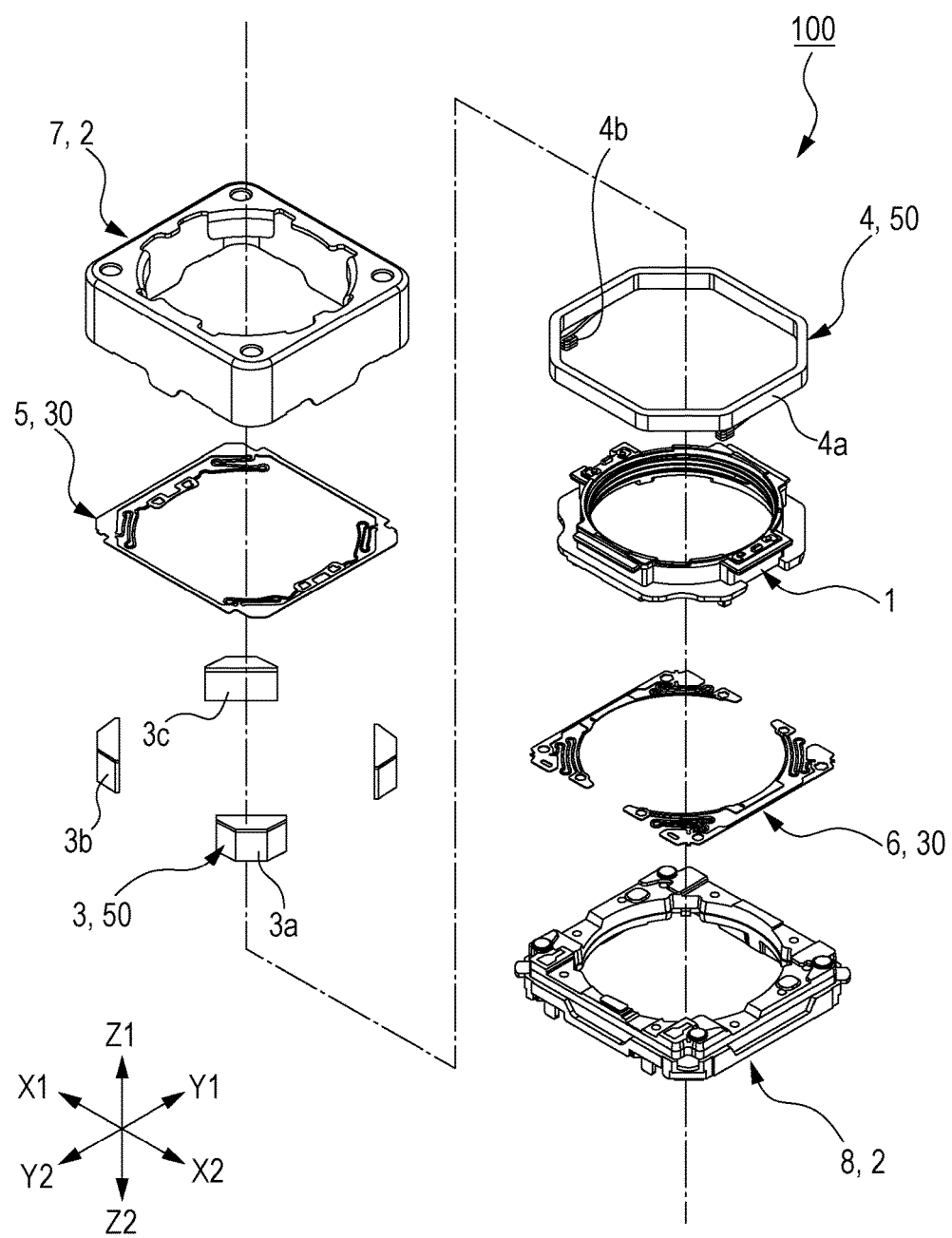
FIG. 1 is an exploded perspective view of the configuration of a lens driving apparatus according to a first embodiment.
Figure 7A:
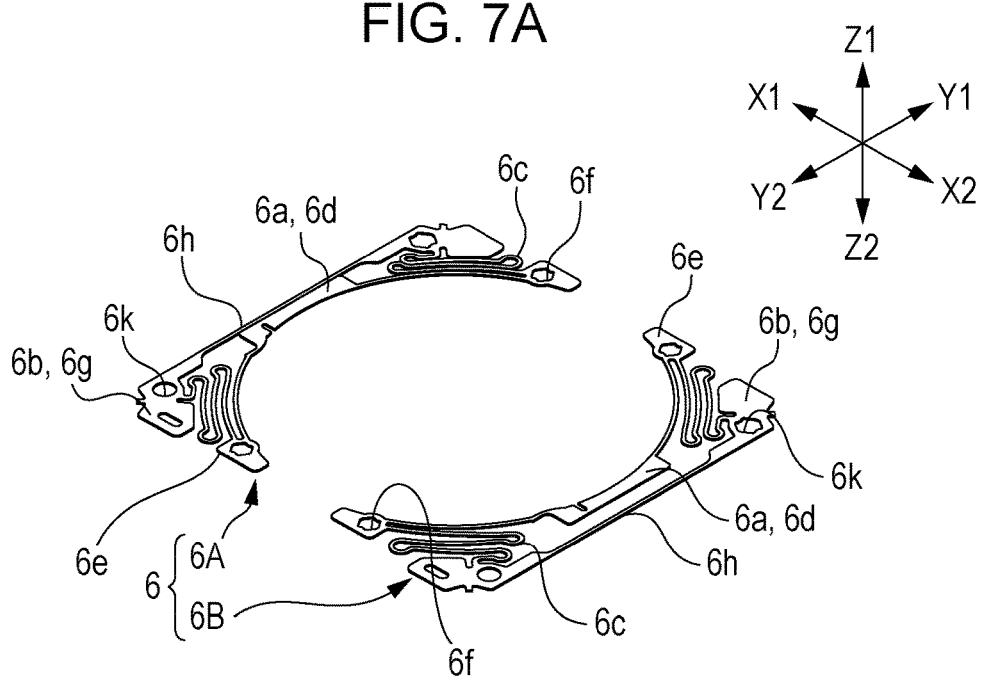
FIGS. 7A and 7B illustrate lower leaf springs according to the first embodiment, where
Figure 7B:
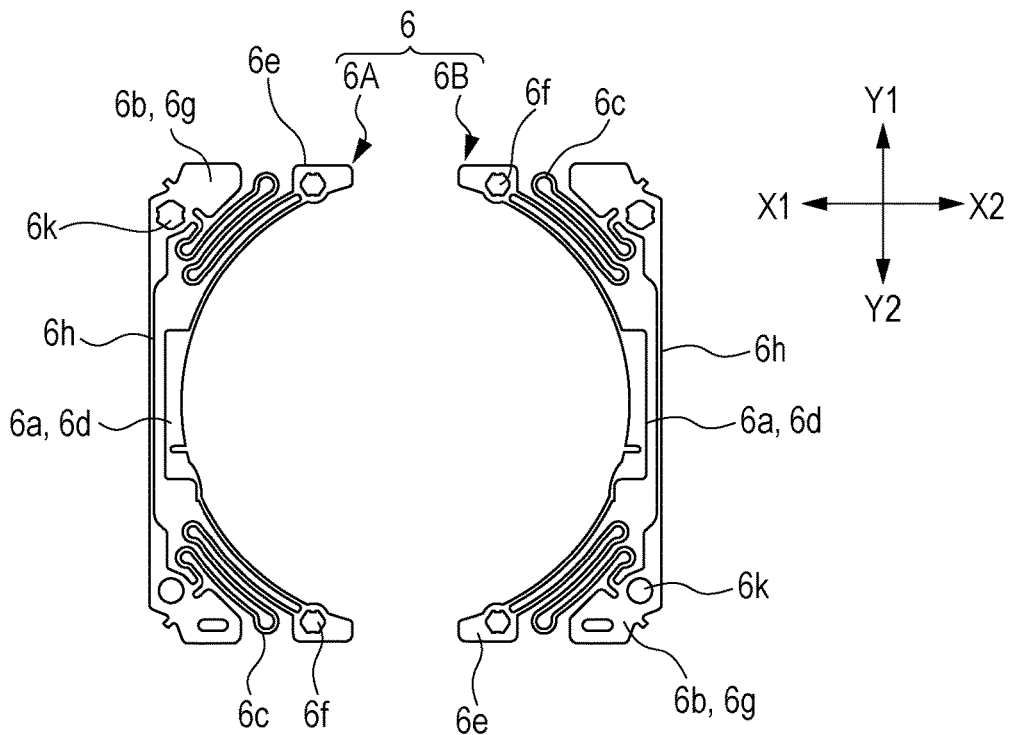
Figure 8A:
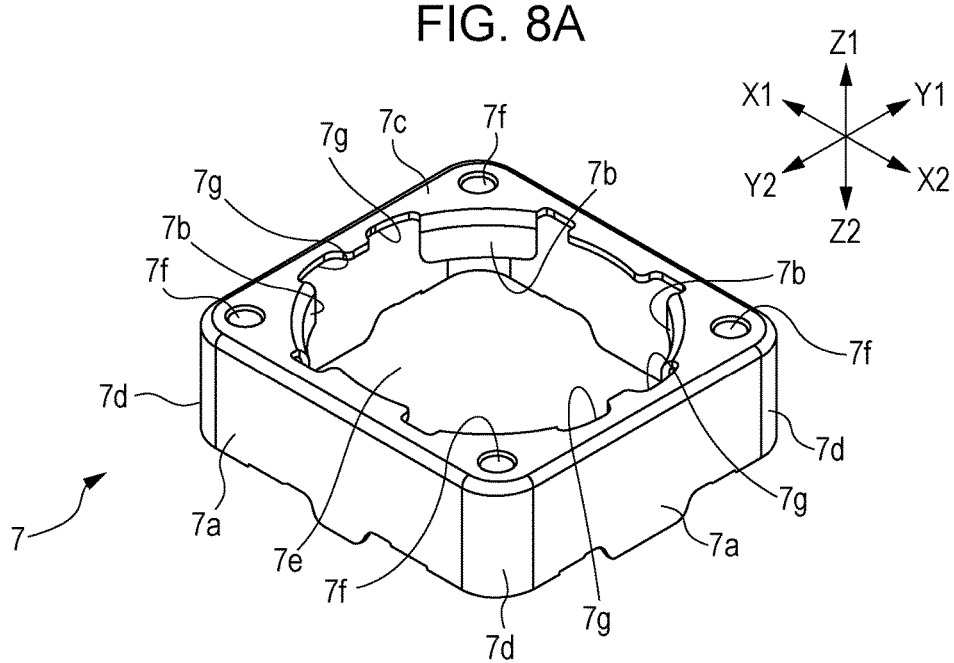
FIGS. 8A and 8B illustrate a housing according to the first embodiment, where
Figure 8B:
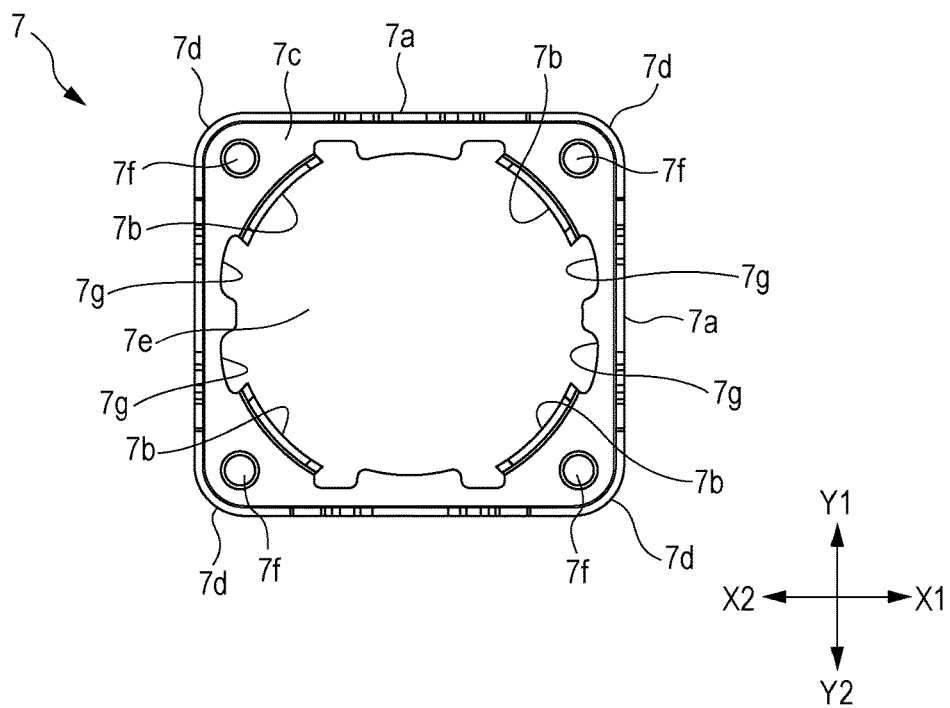
Figure 9:
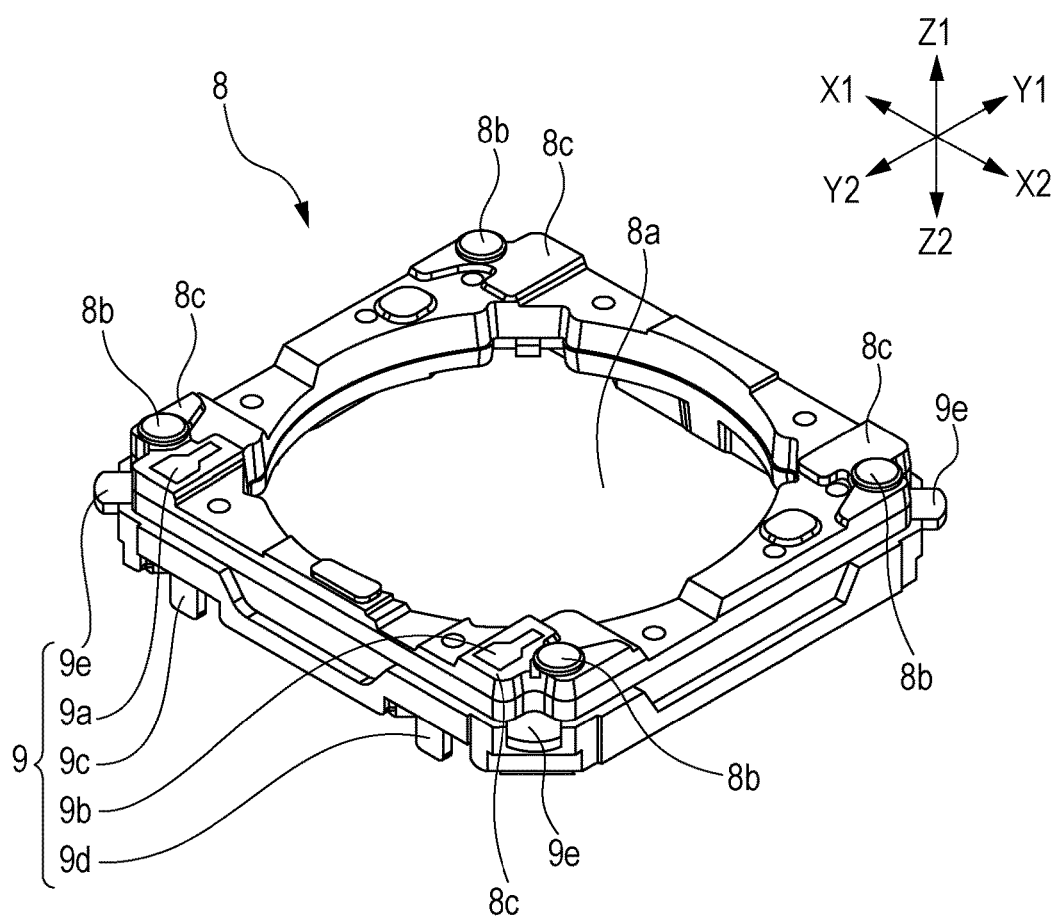
FIG. 9 is a perspective view of an appearance of a base member according to the first embodiment.

Referring to FIG. 1 to FIG. 9 first, a configuration of the lens driving apparatus 100 according to the embodiment is described. FIG. 1 is an exploded perspective view of the configuration of the lens driving apparatus 100 according to the first embodiment. FIGS. 2A and 2B illustrate an appearance of the lens driving apparatus 100 according to the first embodiment, where FIG. 2A is a perspective view of the appearance of the lens driving apparatus 100 and FIG. 2B is a plan view of the lens driving apparatus 100 when viewed from the Z1 side illustrated in FIG. 2A. FIGS. 3A and 3B illustrate a lens holding member 1 according to the first embodiment, where FIG. 3A is a perspective view of the appearance of the lens holding member 1 and FIG. 3B is a perspective view of the appearance of the lens holding member 1 when viewed from the Z2 side in FIG. 3A. FIGS. 4A and 4B illustrate a portion IVA illustrated in FIG. 3A, where FIG. 4A is an enlarged perspective view of the portion IVA illustrated in FIG. 3A and FIG. 4B is a plan view of the portion IVA when viewed from the Z1 side illustrated in FIG. 4A. FIGS. 5A to 5C illustrate a coil 4 according to the first embodiment in the state of being held by the lens holding member 1, where FIG. 5A is a perspective view of the coil 4 in the state of being held by the lens holding member 1, FIG. 5B is a perspective view of the coil 4 in the state of being held by the lens holding member 1 when viewed from the Z2 side illustrated in FIG. 5A, FIG. 5C is an enlarged perspective view of a portion VC illustrated in FIG. 5B. FIGS. 6A and 6B illustrate an upper leaf spring 5 according to the first embodiment, where FIG. 6A is a perspective view of an appearance of the upper leaf spring 5 and FIG. 6B is an enlarged plan view of a portion VIB illustrated in FIG. 6A when viewed from the Z1 side. FIGS. 7A and 7B illustrate a lower leaf spring 6 according to the first embodiment, where FIG. 7A is a perspective view of an appearance of the lower leaf spring 6 and FIG. 7B is a plan view of the lower leaf spring 6 when viewed from the Z1 side illustrated in FIG. 7A. FIGS. 8A and 8B illustrate a housing 7 according to the first embodiment, where FIG. 8A is a perspective view of an appearance of the housing 7 and FIG. 8B is a plan view of the housing 7 when viewed from the Z2 side illustrated in FIG. 8A. FIG. 9 is a perspective view of an appearance of a base member 8 according to the first embodiment.

Figure 2A:
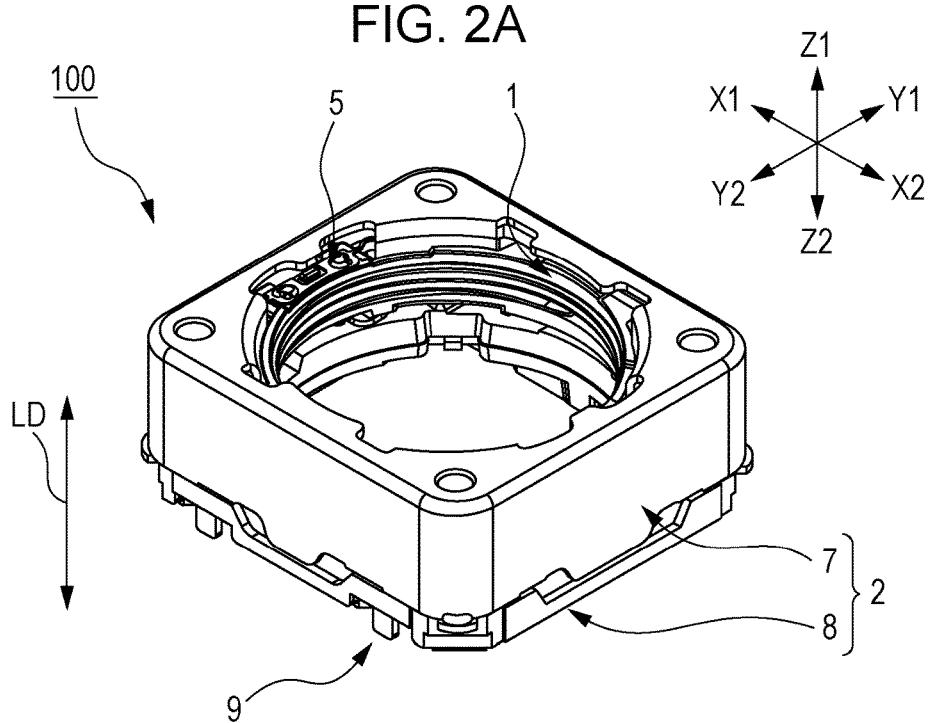
FIGS. 2A and 2B illustrate an appearance of the lens driving apparatus according to the first embodiment, where
Figure 2B:
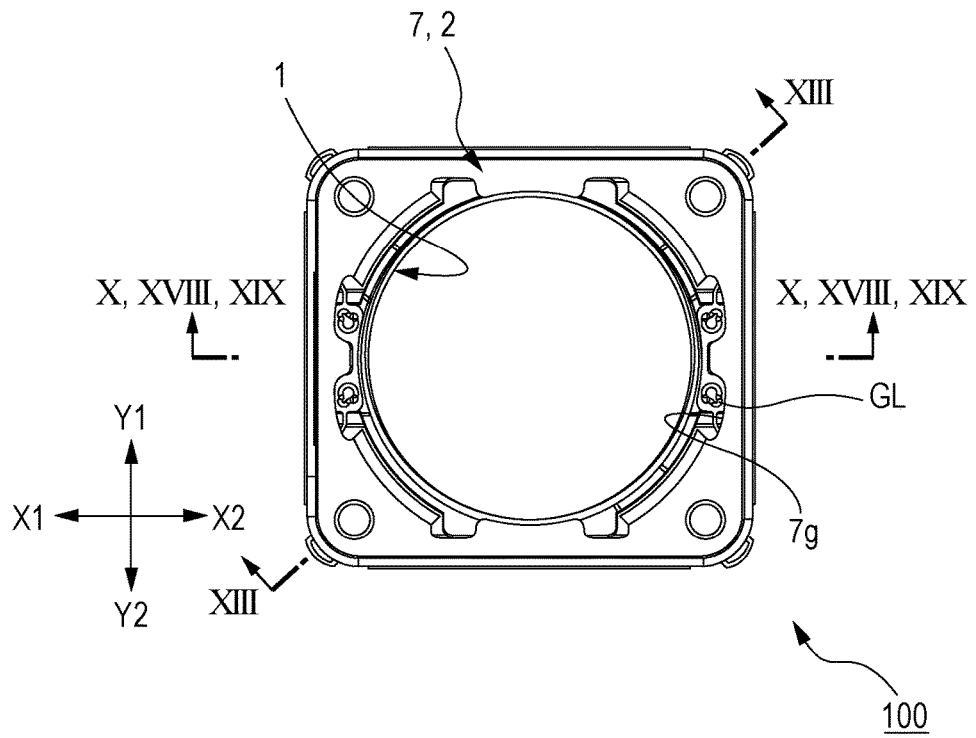

As illustrated in FIG. 1, the lens driving apparatus 100 includes a lens holding member 1, a static member 2 including a housing 7 and a base member 8, a moving mechanism 50 including at least magnets 3 and a coil 4, and a biasing member 30 including an upper leaf spring 5 and lower leaf springs 6. As illustrated in FIGS. 2A and 2B, the lens driving apparatus 100 has a substantially rectangular parallelepiped shape. The lens driving apparatus 100 is capable of moving the lens holding member 1 in an optical axis direction LD (Z1 and Z2 directions).

Figure 3A:
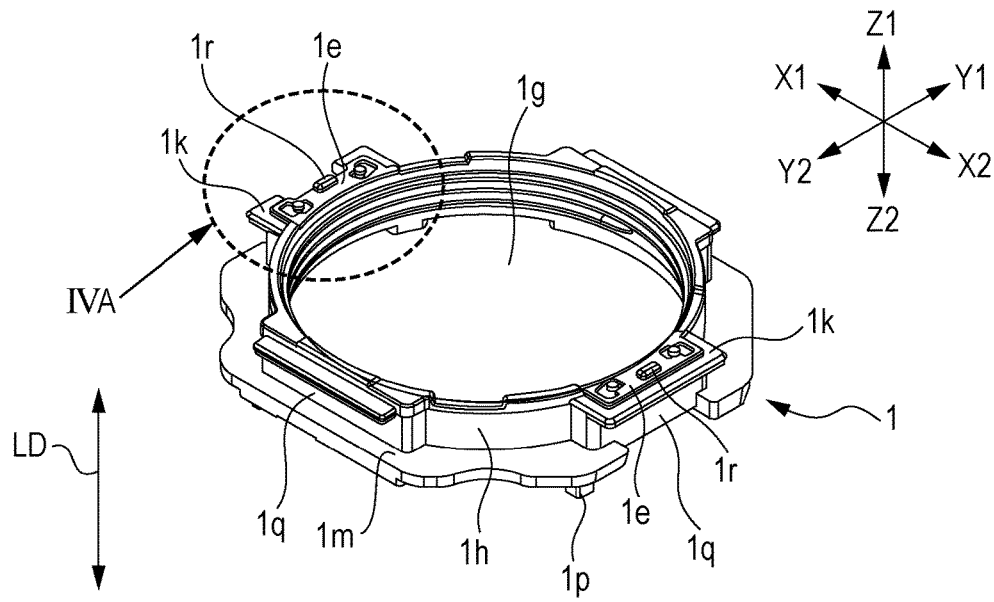
FIGS. 3A and 3B illustrate a lens holding member according to the first embodiment, where
Figure 3B:
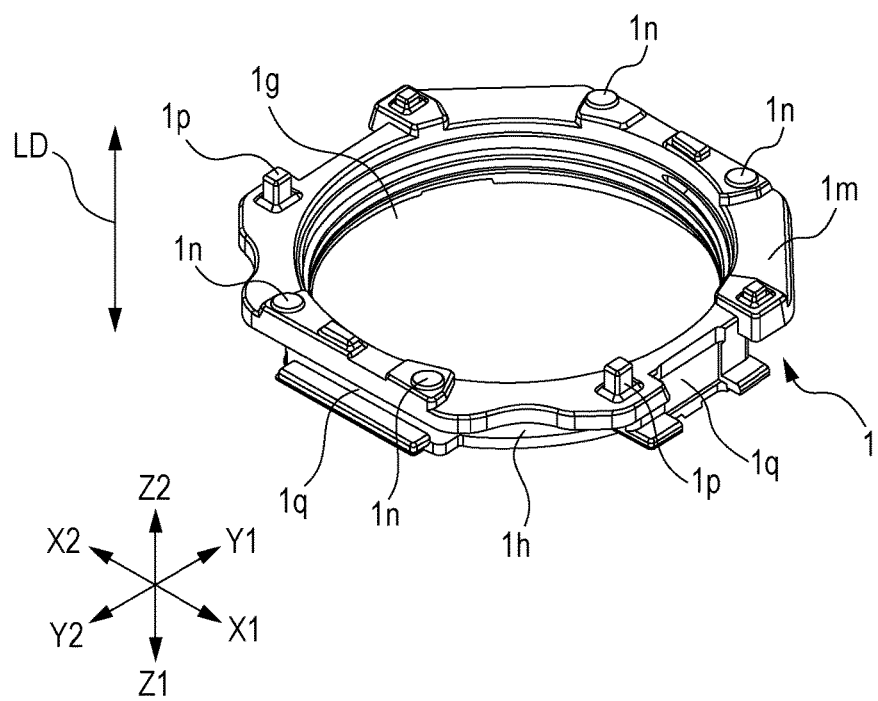

The lens holding member 1 is made of synthetic resin and formed in a tubular shape so as to be capable of holding a lens body, as illustrated in FIGS. 3A and 3B. The lens holding member 1 has a tubular portion 1h having a tubular shape. The tubular portion 1h has both ends open and has a hollow opening 1g. On an inner circumferential wall of the opening 1g, a screw thread is formed so as to hold the lens body. On an outer circumferential surface of the tubular portion 1h, coil holding units 1q that protrude outward are disposed at equal intervals at four positions. In this embodiment, the coil holding units 1q are disposed on the X1 and X2 sides and Y1 and Y2 sides of the tubular portion 1h. On a first end side (Z1 side) of the tubular portion 1h, upper leaf spring receiving portions 1k that extend in directions away from the outer circumferential surface at the end portion are formed. The upper leaf spring receiving portions 1k are disposed at opposing positions across the opening 1g. In this embodiment, upper leaf spring receiving portions 1k are disposed on the X1 and X2 sides, one at each side, so as to be continuous with the corresponding coil holding units 1q.

Figure 4A:
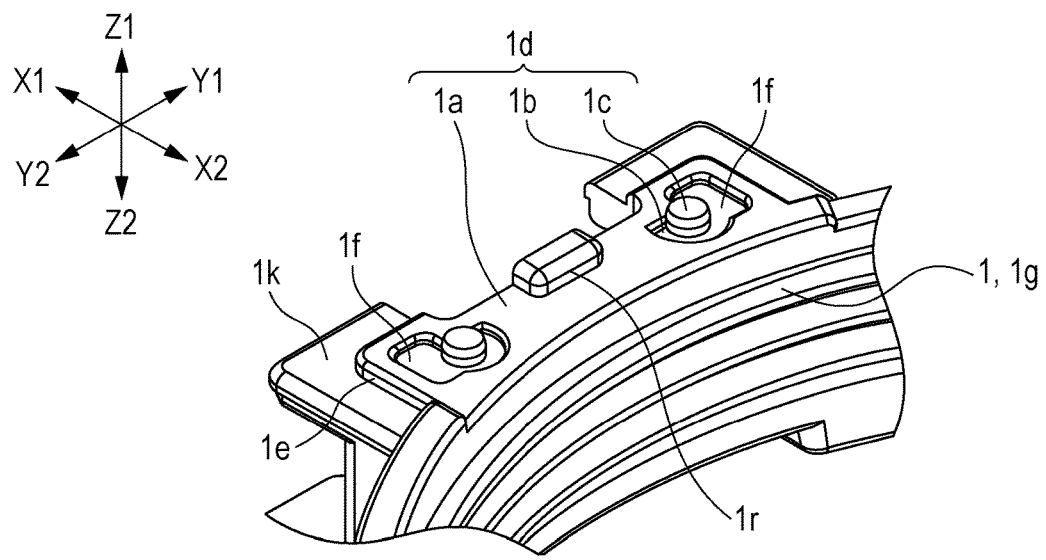
FIGS. 4A and 4B illustrate a portion IVA illustrated in FIG. 3A, where
Figure 4B:
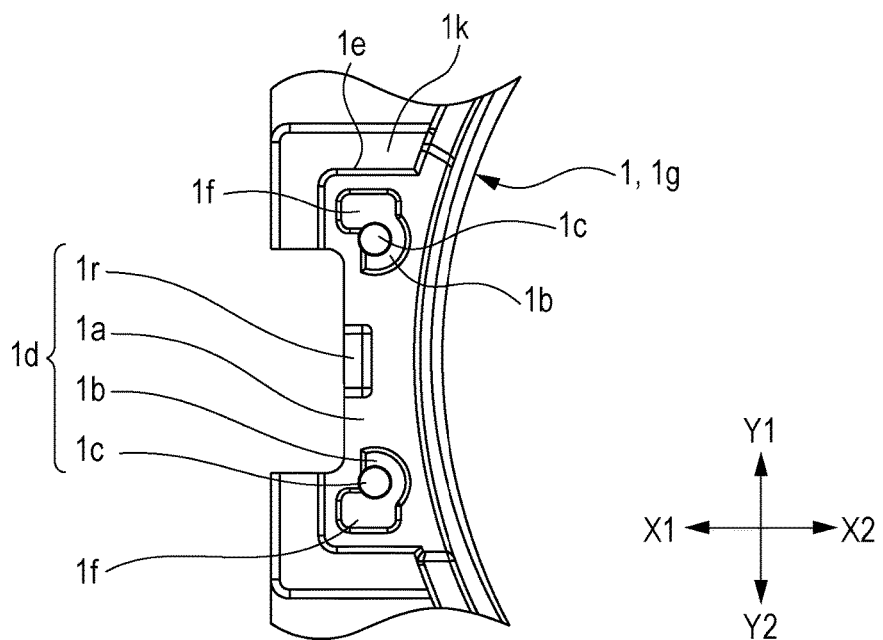

As illustrated in FIGS. 4A and 4B, a base portion 1e is formed on an upper surface of each upper leaf spring receiving portion 1k so as to protrude upward (Z1 direction) and the base portion 1e includes a fastening portion 1d. The fastening portion 1d includes a mount surface 1a, which is an upper surface having a flat shape, recesses 1b recessed with respect to the mount surface 1a, and protrusions 1c that protrude from the recesses 1b and have a columnar shape. Each recess 1b serves as an adhesive holding portion that faces a through hole 5f of the upper leaf spring 5, which is described below. The recess 1b formed on the Y1 side has an extension portion 1f that is recessed and extends in the Y1 direction. The recess 1b formed on the Y2 side has an extension portion 1f that is recessed and extends in the Y2 direction. The fastening portion 1d has a rectangular parallelepiped stopper protrusion 1r protruding upward at a position between the recesses 1b on the mount surface 1a.

As illustrated in FIGS. 3A and 3B, the lens holding member 1 has a flange portion 1m, which expands in a direction away from the outer circumferential surface of the end portion on a second end side (Z2 side) of the tubular portion 1h. The flange portion 1m is disposed around almost the entire circumference of the tubular portion 1h. On the end surface of the second end side of the tubular portion 1h including the flange portion 1m, lower holding protrusions 1n and coil-wound protrusions 1p are disposed. The lower holding protrusions 1n have a columnar shape and protrude in the optical axis direction LD (in the Z2 direction). The lower holding protrusions 1n are provided at two positions on each side (each of Y1 and Y2 sides in FIG. 3B) so as to face the corresponding lower holding protrusions 1n across the opening 1g. The coil-wound protrusions 1p have a rectangular parallelepiped shape and protrude in the optical axis direction LD (in the Z2 direction). The coil-wound protrusions 1p are disposed at opposing positions across the opening 1g (one on each of X1 and X2 sides in FIGS. 3A and 3B).

The coil 4 is made of a metal wire having electric conductivity. As illustrated in FIG. 1, the coil 4 includes a wound coil portion 4a and end portions 4b. The wound coil portion 4a is formed so as to be wound around the outer circumference of the tube. Both end portions 4b of the metal wire extend from the wound coil portion 4a. The surface of the portion of the metal wire forming the wound coil portion 4a is coated with a nonconductive material. Turns of the wound coil portion 4a are insulated with one another at the surface of the metal wire. When an electrical current is caused to pass through the coil 4, the electrical current circularly flows through the metal wire.

Figure 5A:
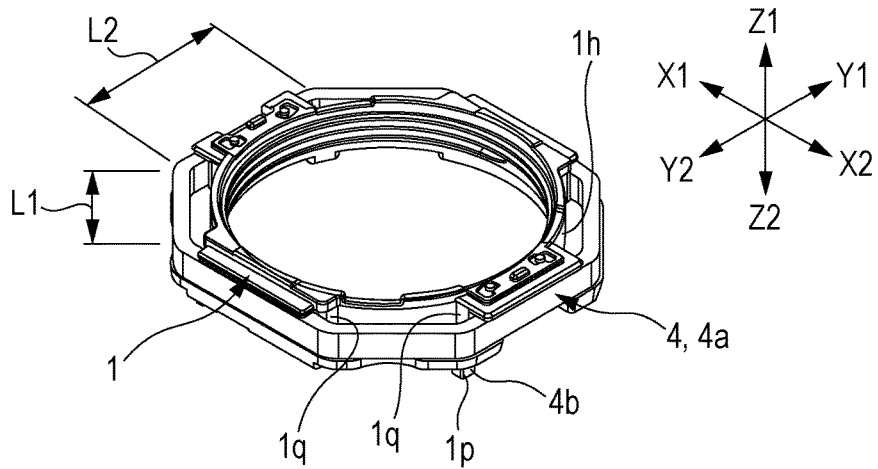
FIGS. 5A to 5C illustrate a coil according to the first embodiment in the state of being held by the lens holding member, where
Figure 5B:
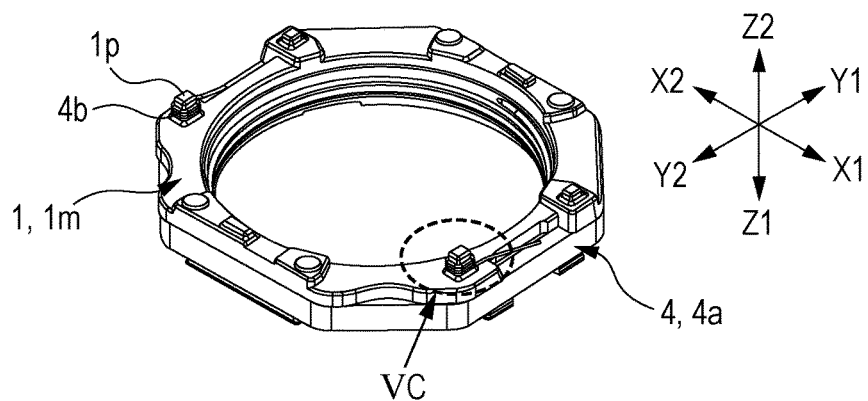
Figure 5C:
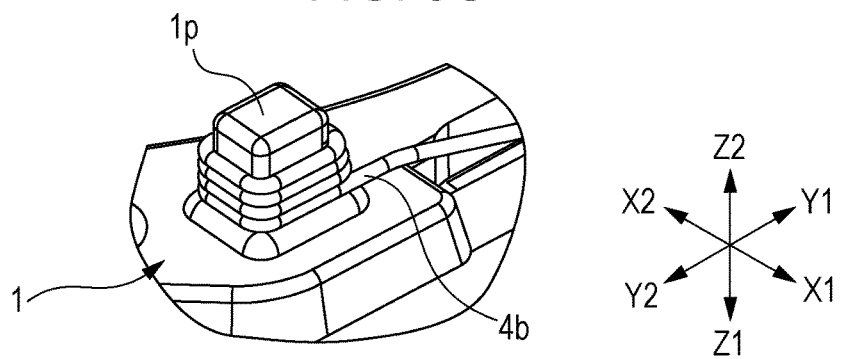

In this embodiment, as illustrated in FIGS. 5A to 5C, the coil 4 is formed by winding a metal wire around the coil holding units 1q of the lens holding member 1. Specifically, the wound coil portion 4a is formed by winding a metal wire around the outer circumference of the lens holding member 1. When the wound coil portion 4a is viewed from above (the Z1 side), the wound coil portion 4a is formed in a shape of an octagon in which short sides having a first length L1 and long sides having a second length L2 longer than the first length L1 are alternately connected together. The portions of the wound coil portion 4a corresponding to the long sides are in contact with the coil holding units 1q and the portions of the wound coil portion 4a corresponding to the short sides are spaced apart from the tubular portion 1h. End portions 4b of the coil 4 are wound around and held at the coil-wound protrusions 1p of the lens holding member 1. In order to prevent the wound metal wire from being unwound, the ends of the end portions 4b of the coil 4 wound around and held at the coil-wound protrusions 1p are subjected to an appropriate fastening measure, such as by being bonded to the coil-wound protrusions 1p using an adhesive or the like or sealed in resin. Alternatively, at the beginning of winding, one end of the end portion 4b may be arranged along and brought into contact with the coil-wound protrusion 1p and the remaining portion of the coil may be wound around the end and the coil-wound protrusion 1p so that the end is held in place. The end portions 4b of the coil 4 wound around the coil-wound protrusions 1p extend from base portions of the coil-wound protrusions 1p so as to be continuous with the wound coil portion 4a.

Figure 6A:
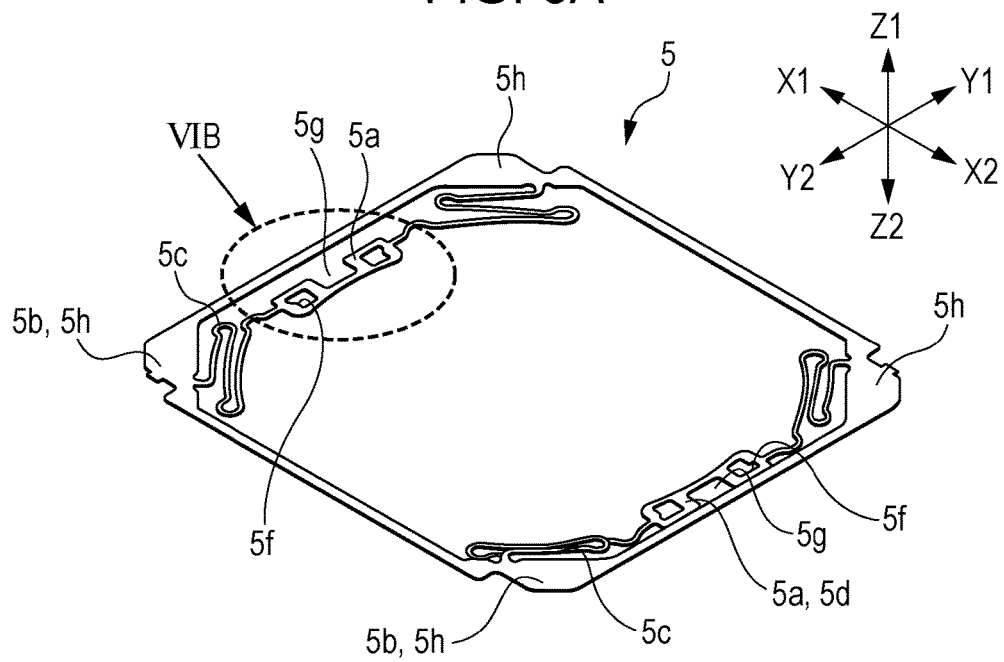
FIGS. 6A and 6B illustrate an upper leaf spring according to the first embodiment, where
Figure 6B:
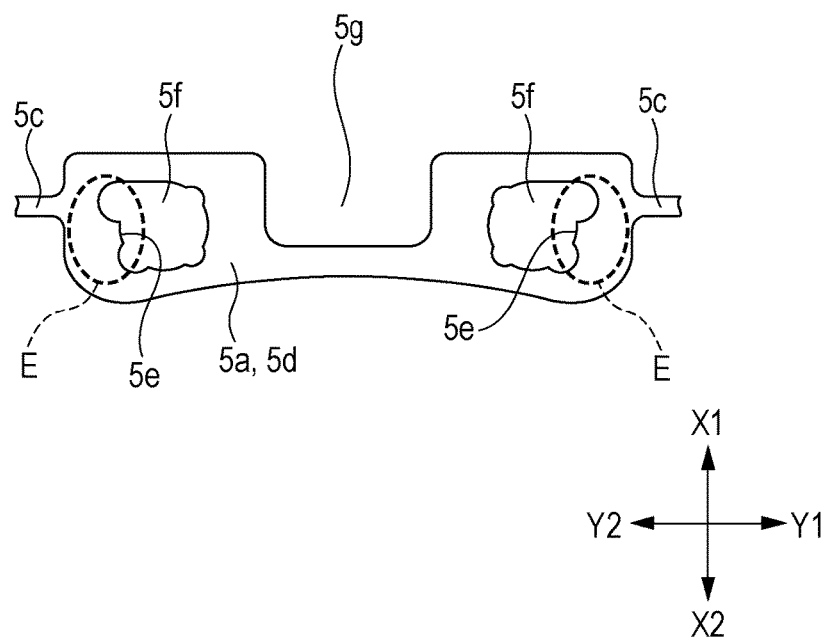

As illustrated in FIG. 1, the biasing member 30 includes an upper leaf spring 5 and a lower leaf spring 6. The upper leaf spring 5 is made of sheet metal. As illustrated in FIGS. 6A and 6B, the upper leaf spring 5 includes upper first portions 5a (first portions), an upper second portion 5b (second portion), and upper elastic arm portions 5c (elastic arm portions) each positioned between the corresponding upper first portion 5a and the upper second portion 5b. The upper second portion 5b is disposed outside the upper first portions 5a. The upper first portions 5a each have a substantially rectangular base portion 5d. The base portion 5d of each upper first portion 5a has through holes 5f on both sides (Y1 and Y2 sides) and an indentation 5g at a position between the through holes 5f. The distance between the through holes 5f is substantially the same as the distance between the protrusions 1c of the lens holding member 1 and the through holes 5f are sized so as to be capable of receiving the protrusions 1c. The through holes 5f have a noncircular shape having recesses and protrusions. In this embodiment, the through holes 5f have fringe portions 5e at the portions E illustrated in FIG. 6B. Each indentation 5g is a cut sized so as to be capable of receiving the corresponding stopper protrusion 1r. The upper first portions 5a are spaced apart from each other at a distance equivalent to the diameter of the opening 1g of the lens holding member 1 and disposed at opposite positions while having their indentations 5g facing away from each other. The upper second portion 5b has an annular shape having a rectangular contour. The upper second portion 5b includes substantially triangular fastening portions 5h, which expand to the inner side of the rectangular, at four corner portions of the rectangular. Each upper elastic arm portion 5c has a corrugated line shape and connects the upper first portion 5a to the adjacent fastening portion 5h of the upper second portion 5b. The upper elastic arm portions 5c have elasticity. For example, while the upper second portion 5b is fixed, upper first portions 5a are vertically movable by bending the upper elastic arm portions 5c.

The lower leaf springs 6 are made of sheet metal. As illustrated in FIGS. 7A and 7B, the lower leaf springs 6 include a first member 6A and a second member 6B, which are symmetrical with respect to a line. The lower leaf springs 6 form annular shape having a rectangular contour when the first member 6A and the second member 6B are arranged side by side. The lower leaf springs 6 are described below without the first member 6A and the second member 6B being distinguished from each other, unless otherwise noted, on the assumption that both of the first member 6A and the second member 6B have the components described below.

Each lower leaf spring 6 has a lower first portion 6a, a lower second portion 6b, and lower elastic arm portions 6c each positioned between the lower first portion 6a and the lower second portion 6b. The first member 6A and the second member 6B are disposed so that the lower first portions 6a face each other and the lower second portions 6b are disposed outward from the lower first portions 6a. The lower first portions 6a have an arc shape. Each lower first portion 6a includes a rectangular-plate-shaped first holding unit 6d at a middle portion and substantially triangular-plate-shaped second holding units 6e at both end portions. The first holding unit 6d and the second holding units 6e are connected together with portions having a curved line shape. Each of the second holding units 6e has a first holding hole 6f through which the corresponding lower holding protrusion 1n of the lens holding member 1 can be inserted. The lower second portion 6b has a linear shape and includes flat third holding units 6g on both ends. The third holding units 6g are connected together with a rail portion 6h. Each third holding unit 6g has a second holding hole 6k, which is a through hole. Here, the second holding hole 6k formed at a first end side (Y2 side) is circular, whereas the second holding hole 6k formed at a second end side (Y1 side) is noncircular (substantially hexagonal).

The lower elastic arm portions 6c have a corrugated line shape and each connect the adjacent second holding unit 6e of the lower first portion 6a to the adjacent third holding unit 6g of the lower second portion 6b. The lower elastic arm portion 6c disposed at the first end side is spaced apart from the first holding unit 6d at such a distance as to allow the coil-wound protrusion 1p of the lens holding member 1 to be inserted through the space between the lower elastic arm portion 6c and the first holding unit 6d.

The first member 6A and the second member 6B having the above described structure are disposed so that their second holding units 6e face each other and so that their lower first portions 6a form a circle having a diameter substantially the same as the diameter of the tubular portion 1h of the lens holding member 1. The distance by which each first holding hole 6f of the first member 6A and the corresponding first holding hole 6f of the second member 6B are spaced apart from each other is the same as the distance by which the lower holding protrusions 1n of the lens holding member 1 on the Y1 or Y2 side are spaced apart from each other. The lower elastic arm portions 6c have elasticity. For example, while the lower second portions 6b are fixed, the lower first portion 6a is vertically movable by bending the lower elastic arm portions 6c.

As illustrated in FIG. 1, the static member 2 includes a base member 8 and a housing 7. The housing 7 is made of a metal plate having magnetism. As illustrated in FIG. 8A, the housing 7 is formed in a hollow, substantially rectangular parallelepiped shape and has an open bottom. The housing 7 includes an annular outer wall portions 7a, four inner wall portions 7b disposed inside the outer wall portions 7a, and a top portion 7c that connects the outer wall portions 7a and the inner wall portions 7b together in such a manner that the outer wall portions 7a and the inner wall portions 7b are spaced apart from one another. The outer wall portions 7a and the inner wall portions 7b extend in the same direction (Z2 direction) so as to be perpendicular to the top portion 7c. The outer wall portions 7a on four sides cross one another. Corner portions 7d are formed at the portions at which the outer wall portions 7a cross one another. The inner wall portions 7b are disposed inside the outer wall portions 7a so as to face the corner portions 7d. When the inner wall portions 7b are viewed from the Z1 or Z2 side, the inner wall portions 7b have such a curved shape as to be convex toward the corresponding corner portions 7d and are disposed so as to form an arc shape. The inner wall portions 7b are formed by performing metalworking on portions of the top portion 7c.

When viewed in a plan, a through hole portion 7e is defined by the inner wall portions 7b, forming the arc shape, at the center of the top portion 7c. The through hole portion 7e has such a diameter as to allow the tubular portion 1h of the lens holding member 1 to be inserted therethrough and the diameter of the arc shape formed by the inner wall portions 7b is smaller than a dimension (distance between opposing short sides) of the wound coil portion 4a of the coil 4. In addition, at opposite positions across the through hole portion 7e, opposing in the X1 and X2 directions in this embodiment, indentations 7g are formed so as to be continuous with the through hole portions 7e. Two indentations 7g are formed side by side on each side. At four corner portions of the top portion 7c, protrusions 7f formed by metalworking so as to protrude downward are disposed. Outermost ends of the protrusions 7f are disposed on the same level plane so as to be parallel to the top portion 7c.

The base member 8 is made of a synthetic resin material. As illustrated in FIG. 9, when viewed in a plan from below (Z2 side), the base member 8 has a rectangular contour and has an annular shape having an open hole 8a, which is a circular through hole, at the center. The base member 8 has flat mount portions 8c, which are disposed at four corners on the upper surface, and mount protrusions 8b, which are disposed on the mount portions 8c and protrude in the Z1 direction. The mount protrusions 8b are so sized as to be insertable into the second holding holes 6k of the lower leaf springs 6 and so positioned as to correspond to the positions of the second holding holes 6k.

A metal member 9 made of a metal plate is embedded in the base member 8 while being partially exposed to the outside. A first connection surface portion 9a and a second connection surface portion 9b, which are portions of the metal member 9, are exposed through the mount portions 8c of the base member 8 disposed on a second side (Y2 side). The first connection surface portion 9a is exposed through the mount portion 8c on the X1 side, whereas the second connection surface portion 9b is exposed through the mount portion 8c on the X2 side. The first connection surface portion 9a and the second connection surface portion 9b are insulated from each other.

At an end portion of the bottom surface of the base member 8 on the second side (Y2 side), a first connection terminal portion 9c and a second connection terminal portion 9d, which are portions of the metal member 9, protrude downward. The first connection terminal portion 9c protrudes from the bottom surface at a portion on the X1 side whereas the second connection terminal portion 9d protrudes from the bottom surface at a portion on the X2 side. The first connection surface portion 9a and the first connection terminal portion 9c are electrically connected to each other whereas the second connection surface portion 9b and the second connection terminal portion 9d are electrically connected to each other.

From the four corner portions of the base member 8, holding portions 9e, which are portions of the metal member 9, are exposed. The holding portions 9e are insulated from the first connection surface portion 9a and the second connection surface portion 9b.

The magnets 3 are formed so as to be capable of being placed in spaces defined by the inner wall portions 7b of the housing 7, the corner portions 7d of the housing 7, and the outer wall portions 7a of the housing 7 continuous with the corner portions 7d. As illustrated in FIG. 1, when the magnets 3 are viewed in a plan from the Z1 side, each magnet 3 is formed in a substantially trapezoidal prism having lateral sides with the equal length. Here, the surface corresponding to the short side of the trapezoid is referred to as a first face 3a, the surfaces corresponding to the lateral sides are referred to as second faces 3b, and the surface corresponding to the long side is referred to as a third face 3c. The first face 3a is formed in such a shape as to correspond to the shape of the inner surface of each corner portion 7d of the housing 7. The second faces 3b are formed in such a shape as to correspond to the shape of the inner surfaces of the outer wall portions 7a. The third face 3c has a length corresponding to the length of the long side of a trapezoid that is shorter than the first length L1 (see FIG. 5A).

Figure 10:
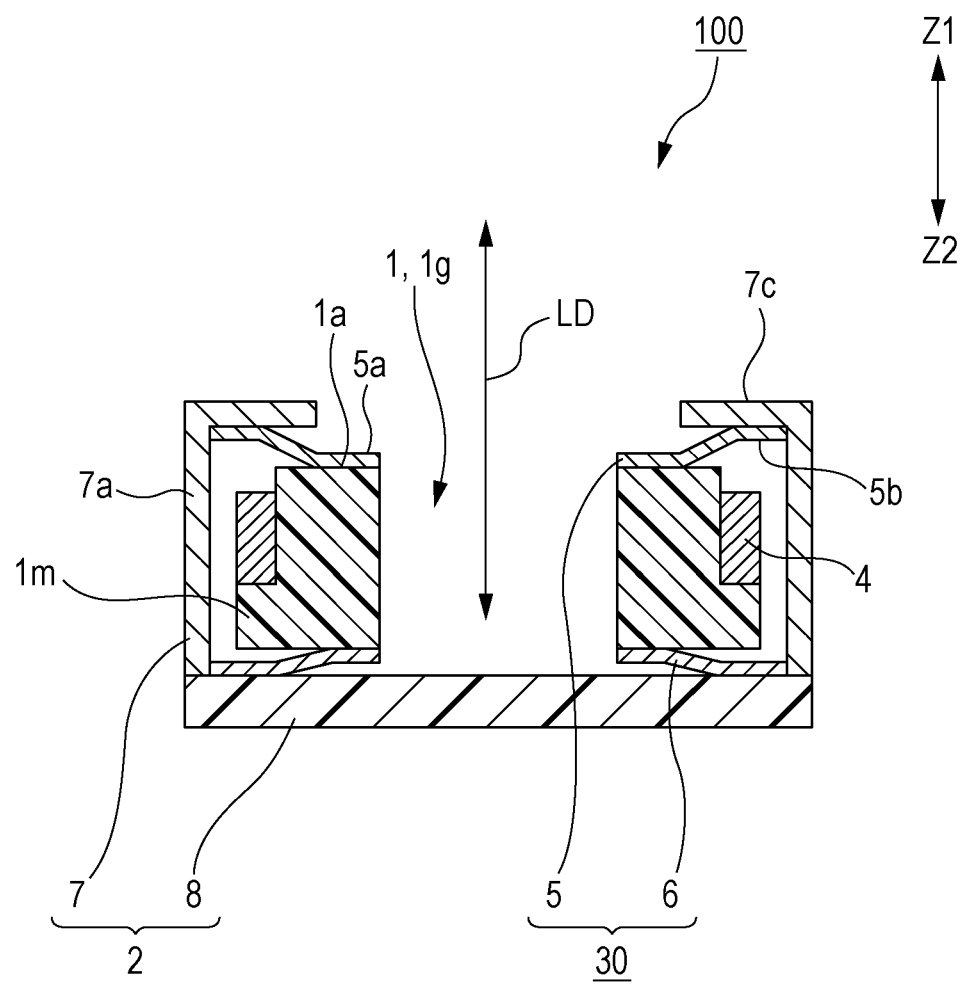
FIG. 10 is a schematic cross-sectional view of the lens driving apparatus taken along the line X-X, XVIII-XVIII, XIX-XIX illustrated in FIG. 2B.
Figure 11A:
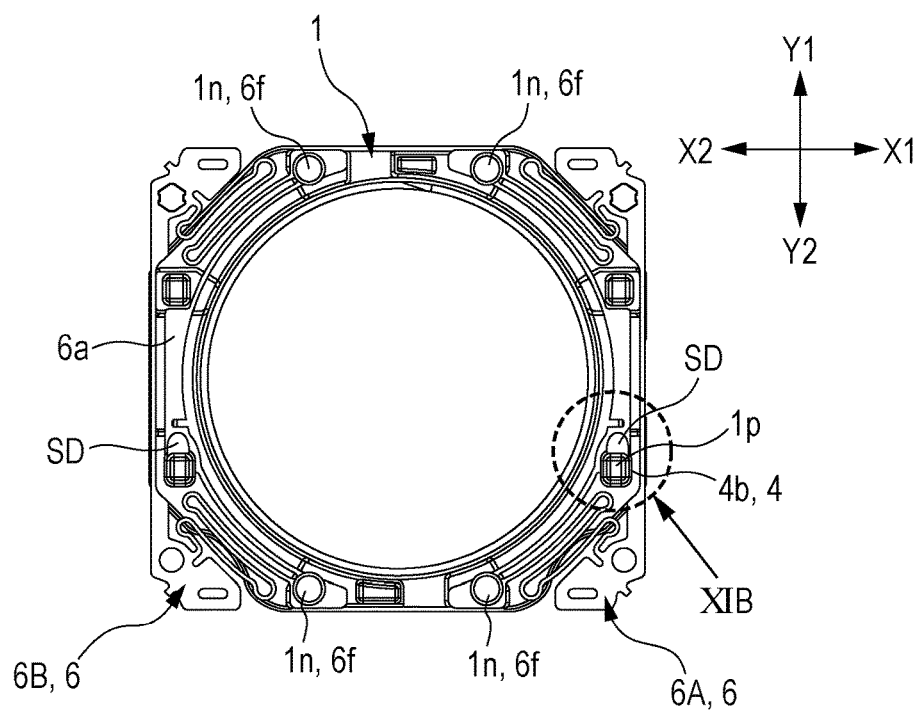
FIGS. 11A and 11B illustrate the lens holding member and the lower leaf spring according to the first embodiment in the state of being fixed to each other, where
Figure 11B:
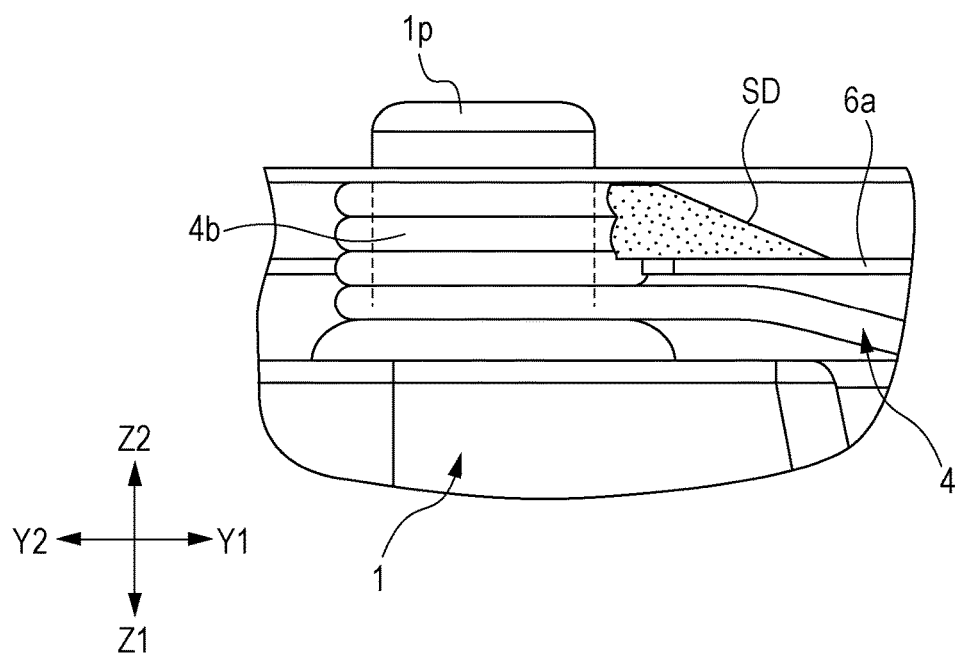
Figure 12:
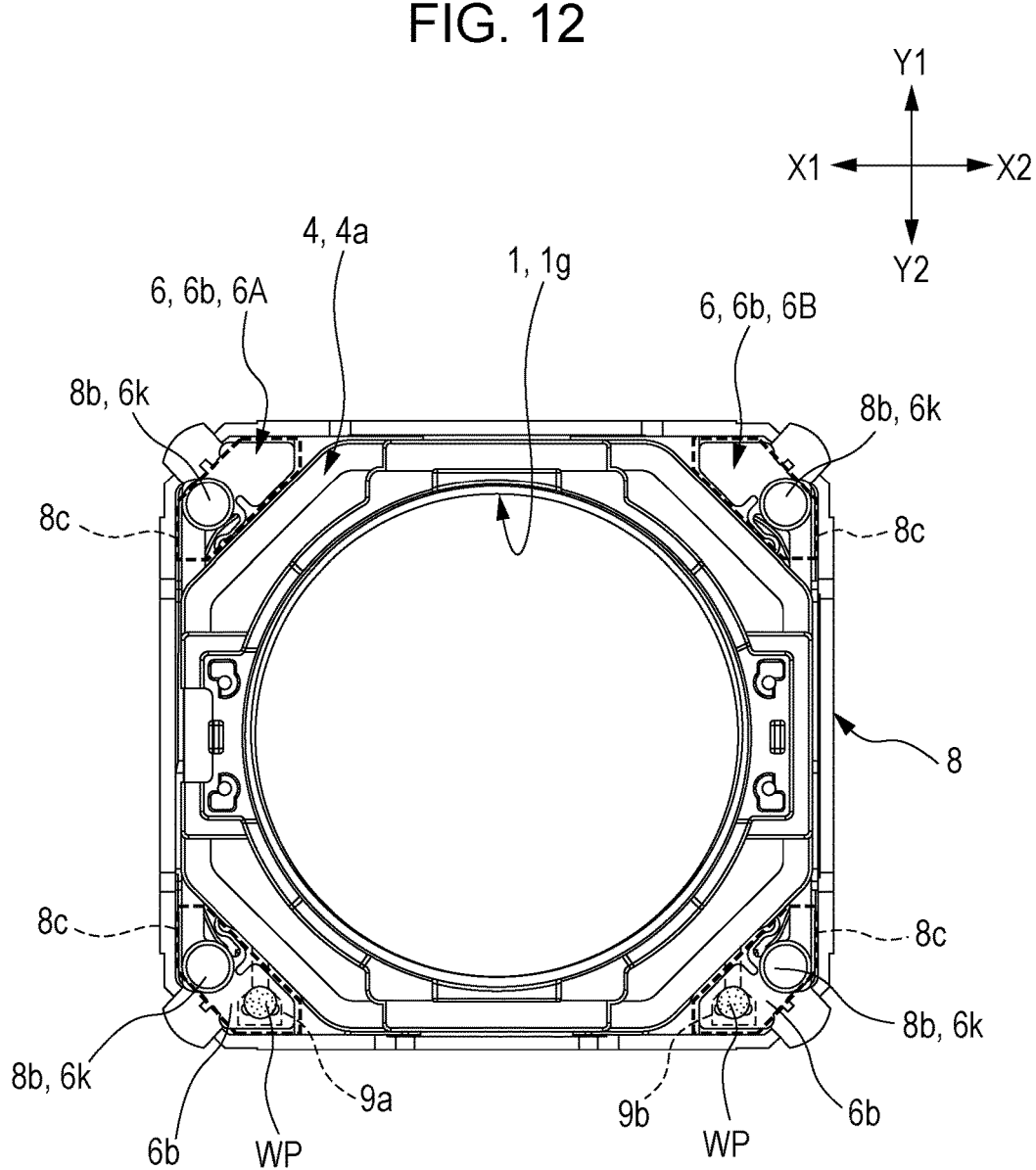
FIG. 12 is a plan view of the lower leaf spring and the base member according to the first embodiment in the state of being connected together.
Figure 13:
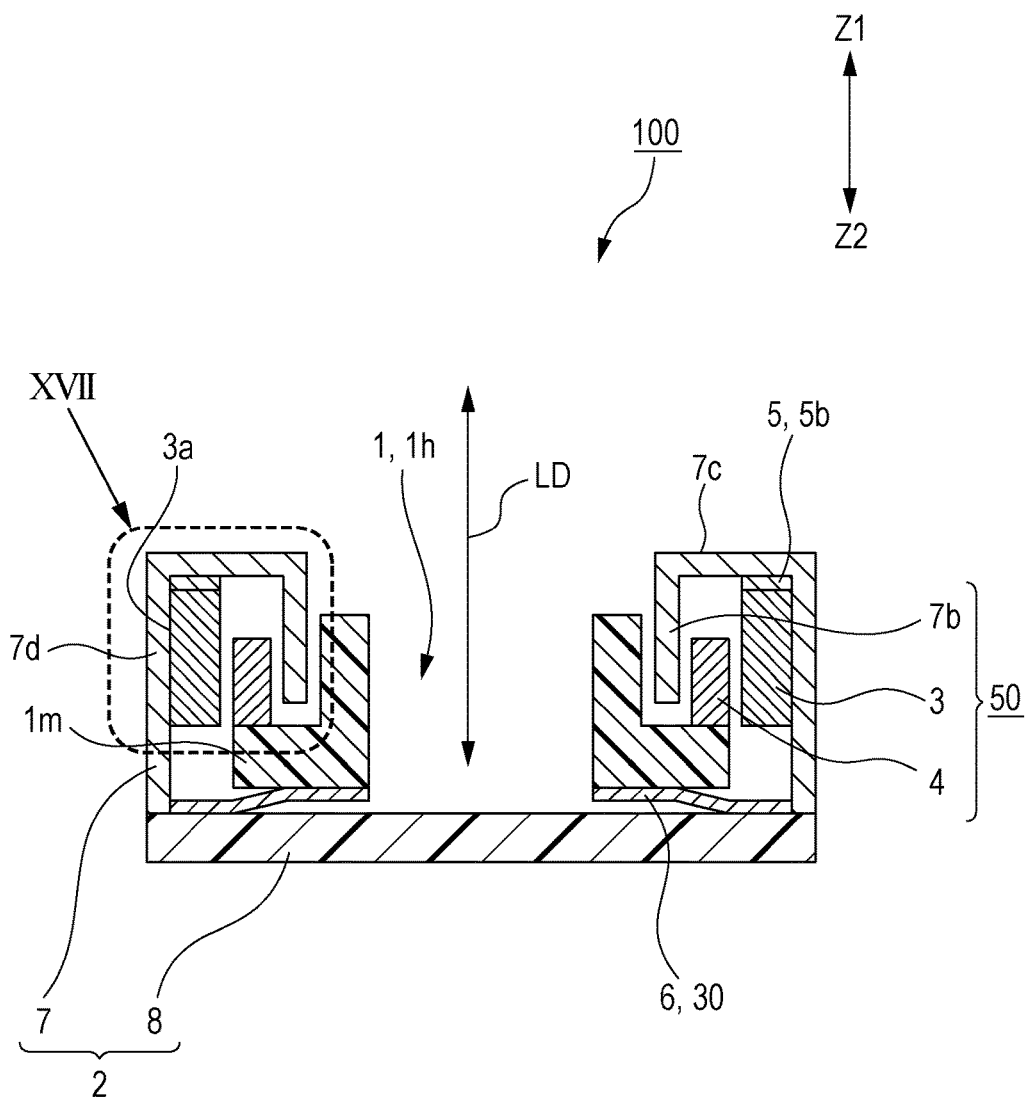
FIG. 13 is a schematic cross-sectional view of the lens driving apparatus taken along the line XIII-XIII illustrated in FIG. 2B.
Figure 14A:
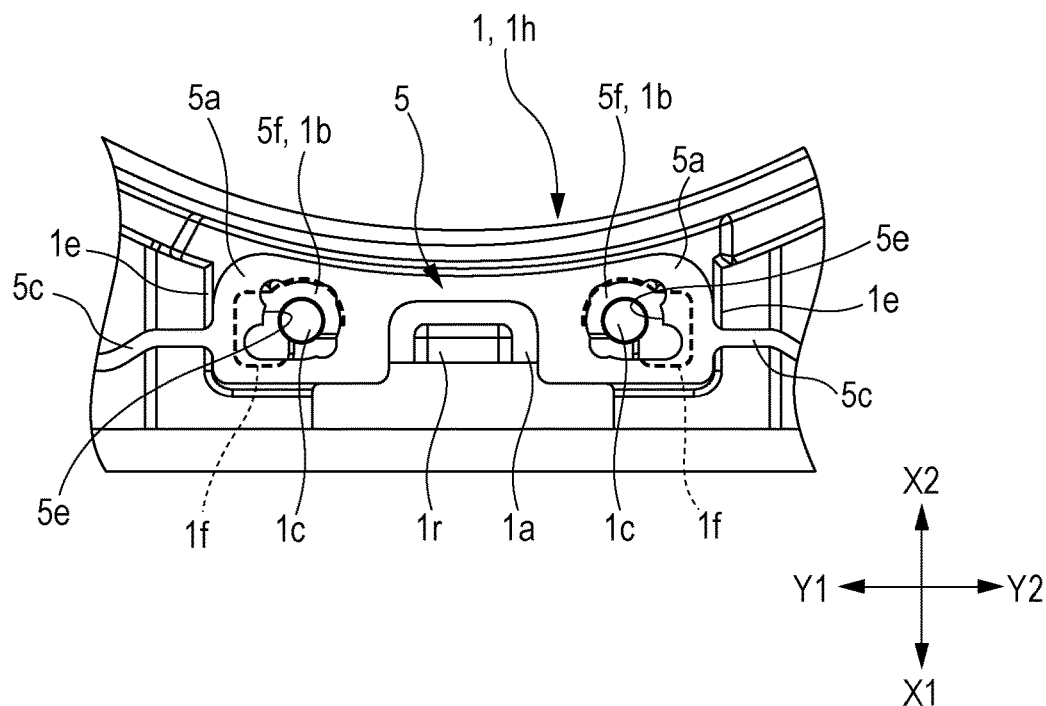
FIGS. 14A and 14B illustrate an upper first portion placed on a mount surface according to the first embodiment, where
Figure 14B:
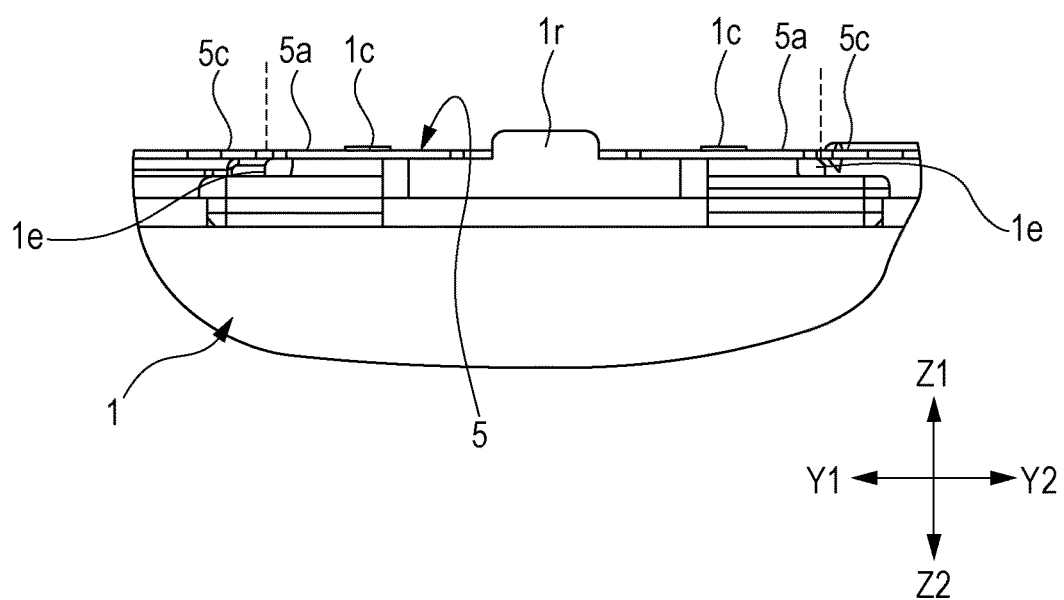
Figure 15A:
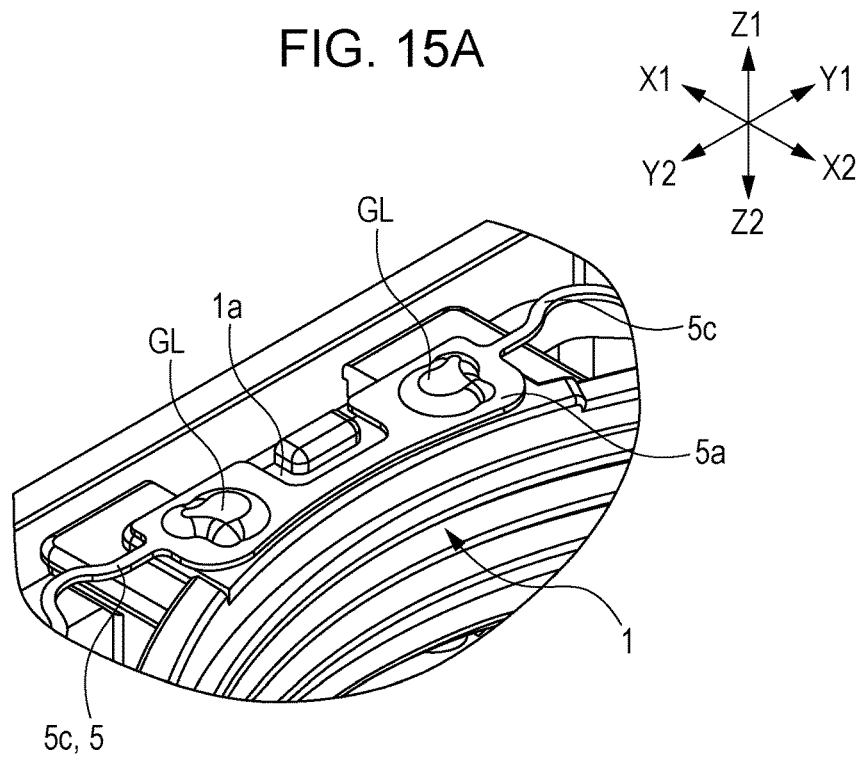
FIGS. 15A and 15B illustrate the upper first portion according to the first embodiment in the state of being joined to the mount surface, where
Figure 15B:
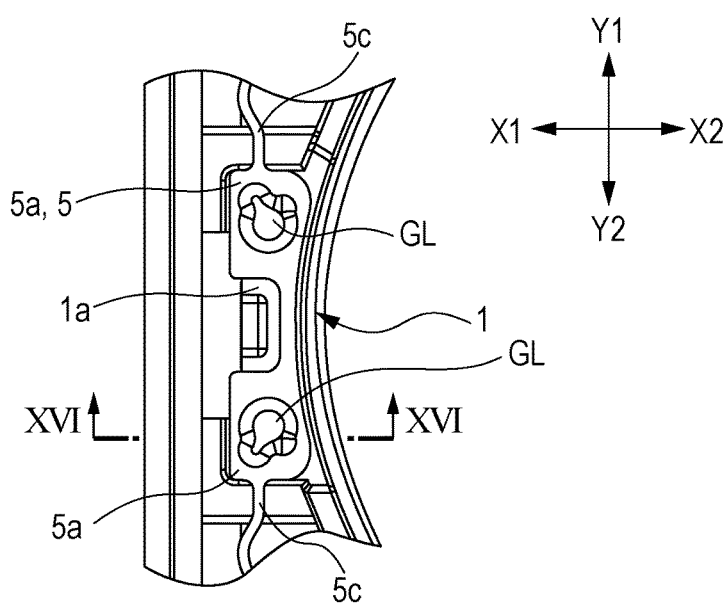
Figure 16:
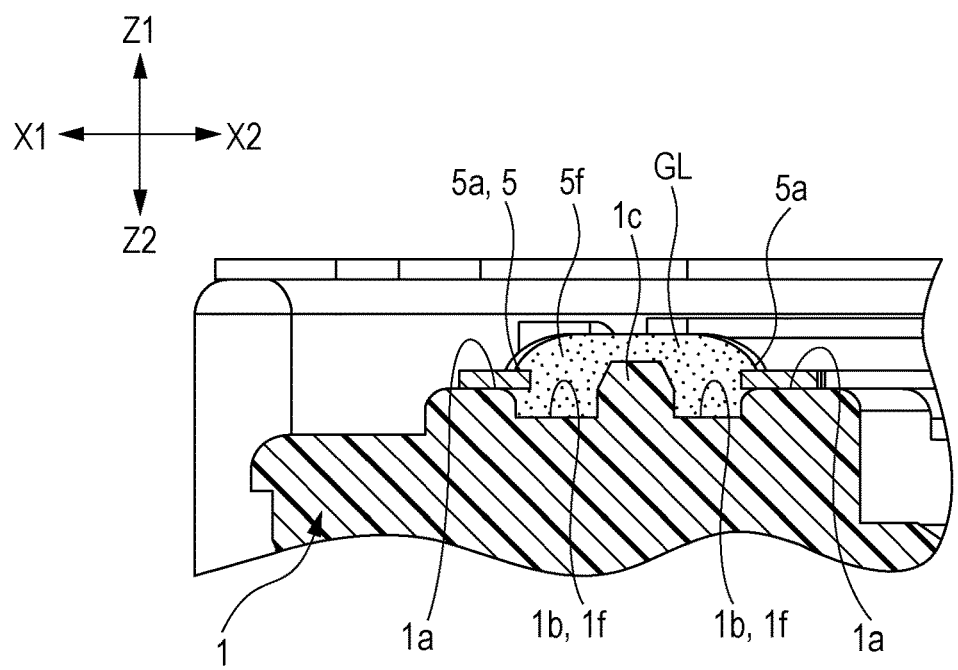
FIG. 16 is a cross-sectional view of the lens driving apparatus taken along the line XVI-XVI illustrated in FIG. 15B.

Referring now to FIGS. 2A and 2B, FIGS. 5A to 5C, and FIGS. 10 to 16, a configuration of the lens driving apparatus 100 is described. FIG. 10 is a schematic cross-sectional view of the lens driving apparatus 100 taken along the line X-X, XVIII-XVIII, XIX-XIX in FIG. 2B. FIGS. 11A and 11B illustrate the lens holding member 1 and the lower leaf springs 6 according to the first embodiment in the state of being fixed to each other, where FIG. 11A is a plan view of the lens holding member 1 and the lower leaf springs 6 in the state of being fixed to each other and FIG. 11B is a schematic side view of a portion XIB illustrated in FIG. 11A when viewed from the X1 side. FIG. 12 is a plan view of the lower leaf springs 6 and the base member 8 according to the first embodiment in the state of being connected together. FIG. 13 is a schematic cross-sectional view of the lens driving apparatus 100 taken along the line XIII-XIII illustrated in FIG. 2B. FIGS. 14A and 14B illustrate an upper first portion 5a placed on a mount surface 1a according to the first embodiment, where FIG. 14A is a plan view of the upper first portion 5a placed on the mount surface 1a and FIG. 14B is a side view of the upper first portion 5a placed on the mount surface 1a when viewed from the X1 side illustrated in FIG. 14A. FIGS. 15A and 15B illustrate the upper first portion 5a according to the first embodiment in the state of being joined to the mount surface 1a, where FIG. 15A is a perspective view of the upper first portion 5a in the state of being joined to the mount surface 1a and FIG. 15B is a plan view of the upper first portion 5a joined to the mount surface 1a when viewed from the Z1 side illustrated in FIG. 15A. FIG. 16 is a cross-sectional view of the lens driving apparatus 100 taken along the line XVI-XVI illustrated in FIG. 15B.

As illustrated in FIGS. 5A to 5C, the coil 4 is wound around the tubular portion 1h of the lens holding member 1 to form a wound coil portion 4a. The end portions 4b of the coil 4 are wound around and held at the coil-wound protrusions 1p. As illustrated in FIG. 10, the lower leaf springs 6 are fixed at the bottom portions (Z2 side) of the flange portions 1m of the lens holding member 1. At this time, as illustrated in FIG. 11A, the lower holding protrusions 1n of the lens holding member 1 are inserted into the first holding holes 6f of the lower leaf spring 6 and then the lower holding protrusions 1n are caulked. Also at this time, the coil-wound protrusions 1p around which the end portions 4b of the coil 4 are wound are slightly spaced apart from the lower first portions 6a and disposed on the Y2 side of the lower first portions 6a in FIG. 11B. The end portions 4b of the coil 4 wound around the coil-wound protrusions 1p are fixed to the lower first portions 6a with solder SD.

Thus, each of the first member 6A and the second member 6B of the lower leaf springs 6 is fixed to the lens holding member 1 at three positions. As illustrated in FIG. 10, the base member 8 is disposed below the lower leaf springs 6 and connected to the lower leaf springs 6. Here, as illustrated in FIG. 12, the lower leaf springs 6 are placed on the mount portions 8c of the base member 8 and the mount protrusions 8b of the base member 8 are inserted into the corresponding second holding holes 6k. Then, the mount protrusions 8b inserted into the second holding holes 6k are caulked, whereby the lower second portions 6b of the lower leaf springs 6 and the base member 8 are connected together. When the lower leaf springs 6 are placed on the mount portions 8c, the lower leaf springs 6 come into contact with the first connection surface portion 9a and the second connection surface portion 9b and are then fixed by a weld WP.

When the base member 8 is fixed so as to be stationary, the lens holding member 1 thus connected to the base member 8 with the lower leaf springs 6 interposed therebetween is biased downward by the biasing force of the lower leaf springs 6 and supported so as to be movable in the optical axis direction LD (Z1 and Z2 directions) illustrated in FIG. 10. In this structure, the first connection terminal portion 9c (see FIG. 9) and the second connection terminal portion 9d (see FIG. 9) are electrically connected to each other via the coil 4 and the lower leaf springs 6.

As illustrated in FIG. 13, the upper leaf spring 5 is disposed inside the housing 7. At this time, the upper leaf spring 5 is held in a space between the outer wall portions 7a (see FIGS. 8A and 8B) and the inner wall portions 7b of the housing 7 in such a manner that the upper second portion 5b comes into contact with the protrusions 7f (see FIGS. 8A and 8B) disposed on the top portion 7c. The magnets 3 are each placed on the inner side of the corresponding one of the four corner portions 7d of the housing 7 in the state where the first face 3a (see FIG. 1) is being in contact with the corresponding corner portion 7d of the housing 7 and the second faces 3b (see FIG. 1) are being in contact with the corresponding outer wall portions 7a continuous with the corner portion 7d on both sides. The magnets 3 are joined and fixed to the housing 7 while tightly holding the fastening portions 5h of the upper leaf spring 5 together with the top portion 7c (protrusions 7f) of the housing 7. Thus, the upper second portion 5b of the upper leaf spring 5 is fixed to the housing 7, which is included in the static member 2.

The housing 7 to which the magnets 3 and the upper leaf spring 5 have thus been fixed is stacked on the base member 8 so as to hold the lens holding member 1 therein. At this time, the inner wall portions 7b of the housing 7 are inserted into the space between the coil 4 and the tubular portion 1h of the lens holding member 1 and the coil 4 is inserted between the inner wall portions 7b and the magnets 3. Here, the tubular portion 1h, the inner wall portion 7b, the coil 4, and the magnet 3, which are adjacent to one another, are spaced apart from one another. Such an arrangement of the inner wall portions 7b, the coil 4, and the magnets 3 forms a moving mechanism 50 according to this embodiment that includes the housing 7, serving as a yoke, the magnets 3, and the coil 4.

As illustrated in FIG. 10, the upper leaf spring 5 is fixed to upper portions of the lens holding member 1 in the following manner. The upper first portions 5a are placed on and fixed by bonding, using a ultraviolet curing adhesive, to the mount surfaces 1a (fastening portions 1d, see FIGS. 4A and 4B), disposed at opposing positions across the opening 1g of the lens holding member 1 so as to correspond to the upper first portions 5a. The upper leaf spring 5 thus fixed to the lens holding member 1 biases the lens holding member 1 upward.

The following describes bonding between each mount surface 1a and the corresponding upper first portion 5a. As illustrated in FIGS. 14A and 14B, the upper first portion 5a is placed on the mount surface 1a in such a manner that the protrusions 1c are inserted into the through holes 5f and the through holes 5f face the recesses 1b, which are adhesive holding portions. When the upper first portion 5a is placed in this manner, each extension portion 1f extends toward the corresponding upper elastic arm portion 5c and each fringe portion 5e is disposed so as to face the corresponding extension portion 1f. The boundary (indicated with broken lines in FIG. 14B) between the upper first portion 5a and the upper elastic arm portion 5c of the upper leaf spring 5 is located at a position corresponding to the outer periphery of the base portion 1e.

When the upper first portion 5a is actually placed, the recesses 1b are filled with an adhesive GL, which is an ultraviolet curing adhesive, as illustrated in FIGS. 15A and 15B around the protrusions 1c. When the upper first portion 5a is placed on the mount surface 1a while the recesses 1b are thus filled with the adhesive GL, the upper first portion 5a is bonded to the mount surface 1a while the protrusions 1c (see FIGS. 14A and 14B) are covered with the adhesive GL, as illustrated in FIGS. 15A and 15B.

Specifically, as illustrated in FIG. 16, the adhesive GL inserted in the recess 1b is provided around the protrusion 1c and part of the adhesive GL spreads to a portion on the upper surface of the upper first portion 5a of the upper leaf spring 5 through the through hole 5f. When the adhesive GL thus positioned receives ultraviolet rays, the adhesive GL cures, and the curing of the adhesive GL fixes the upper leaf spring 5 to the lens holding member 1. At the same time, the adhesive GL that has entered the extension portion 1f, which is part of the recess 1b, covers portions on the upper and lower surfaces of the upper first portion 5a extending along the fringe portion 5e.

In this manner, the lower surface of the upper first portion 5a is bonded with the adhesive GL to the mount surface 1a (fastening portion 1d, see FIGS. 4A and 4B) of the lens holding member 1 and the upper surface of the upper first portion 5a is also held with the adhesive GL. The adhesive GL with which the upper first portion 5a is thus bonded to the mount surface 1a (fastening portion 1d, see FIGS. 4A and 4B) of the lens holding member 1 is disposed at portions that are open upward through the indentations 7g, as illustrated in FIGS. 2A and 2B. Thus, ultraviolet rays are applied to the adhesive GL through the indentation 7g.

The lens driving apparatus 100 is formed in this manner.

Figure 17:
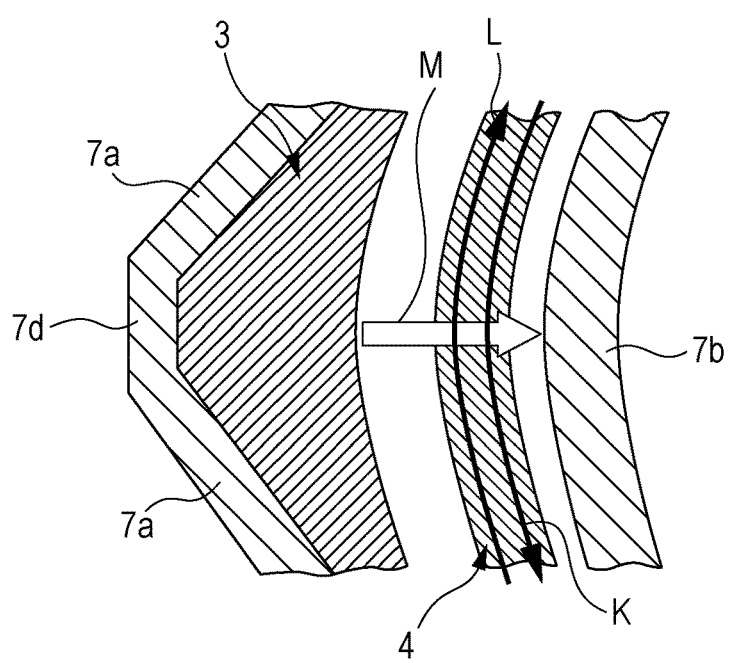
FIG. 17 is a schematic view of the positional relationship between an inner wall portion, a coil, and a magnet when a portion XVII illustrated in FIG. 13 is viewed from the Z1 side.
Figure 20:
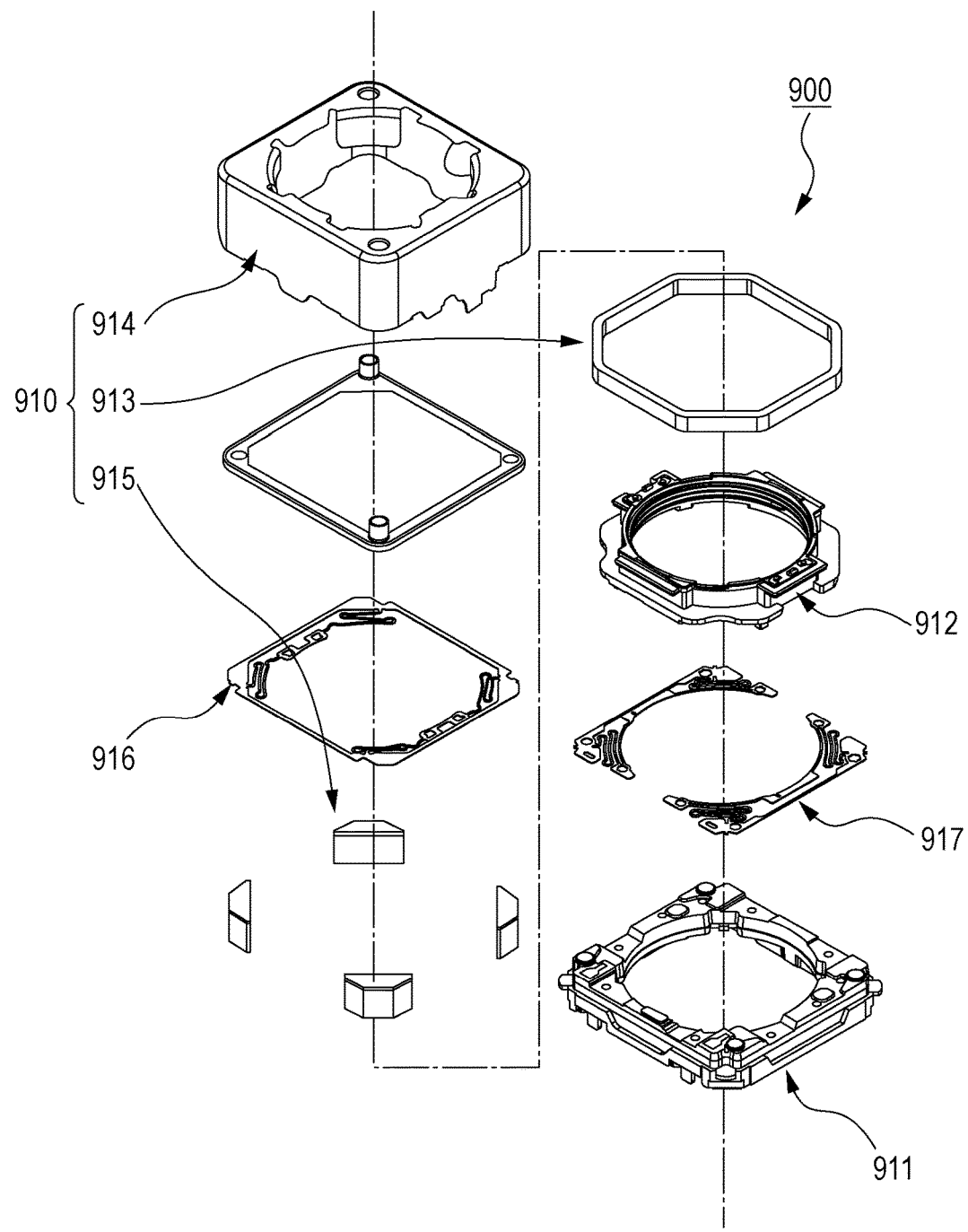
FIG. 20 is an exploded perspective view of the configuration of a lens driving apparatus described in Japanese Registered Utility Model No. 3183101.

Referring now to FIG. 10, FIG. 13, FIG. 17 to FIG. 19, an operation of the lens driving apparatus 100 is described. FIG. 17 is a schematic view of the positional relationship between the inner wall portion 7b, the coil 4, and the magnet 3 when a portion XVII illustrated in FIG. 13 is viewed from the Z1 side. FIG. 18 is a schematic cross-sectional view of the lens driving apparatus 100 taken along the line X-X, XVIII-XVIII, XIX-XIX in FIG. 2B in the state where the lens holding member 1 according to the first embodiment has been moved upward. FIG. 19 is a schematic cross-sectional view of the lens driving apparatus 100 taken along the line X-X, XVIII-XVIII, XIX-XIX in FIG. 2B in the state where the lens holding member 1 according to the first embodiment has been moved downward. In FIG. 18 and FIG. 19, the lens holding member 1, the coil 4, the upper leaf spring 5, and the lower leaf springs 6 in the initial state are indicated by broken lines.

In the lens driving apparatus 100, the upper leaf spring 5 biases the lens holding member 1 upward and the lower leaf springs 6 bias the lens holding member 1 downward. Thus, in the state where the lens driving apparatus 100 is not provided with electricity, that is, in the initial state where an electrical current is not caused to pass through the coil 4, the lens holding member 1 is positioned at a position at which the biasing force of the lower leaf springs 6 biasing the lens holding member 1 downward and the biasing force of the upper leaf spring 5 biasing the lens holding member 1 upward are in balance, as illustrated in FIG. 10. Here, the lens holding member 1 is vertically movable (in the Z1 and Z2 directions) against the biasing force of the lower leaf springs 6 and the biasing force of the upper leaf spring 5. Specifically, the biasing member 30 supports the lens holding member 1 in such a manner that the lens holding member 1 is movable in the optical axis direction LD.

As illustrated in FIG. 13 and FIG. 17, the moving mechanism 50 includes the inner wall portions 7b, the magnets 3, and the coil 4 and moves the lens holding member 1 in the optical axis direction LD. In the moving mechanism 50, one inner wall portion 7b, the coil 4, and the corresponding magnet 3 are arranged in this order on the same straight line. The electricity can be applied to the lens driving apparatus 100 through the first connection terminal portion 9c (see FIG. 9) and the second connection terminal portion 9d (see FIG. 9). After the electricity is applied to the lens driving apparatus 100, an electrical current flows through the coil 4. The direction of the magnetic field of the magnet 3 is defined as the direction of arrow M illustrated in FIG. 17. In the moving mechanism 50, the magnets 3 and the coil 4 are disposed so as to face each other. Specifically, since the coil 4 is disposed in the magnetic field of the magnets 3, a Lorentz force is exerted on the coil 4 when an electrical current flows through the coil 4.

After the electricity is applied to the lens driving apparatus 100 and an electrical current flows in the direction of, for example, arrow K illustrated in FIG. 17, a Lorentz force in the Z1 direction illustrated in FIG. 13 is exerted on the coil 4, whereby the lens holding member 1 integrated with the coil 4 moves upward (in the Z1 direction) against the biasing force of the lower leaf springs 6, as illustrated in FIG. 18.

When an electrical current flows in the direction of arrow L illustrated in FIG. 17, a Lorentz force in the Z2 direction illustrated in FIG. 13 is exerted on the coil 4, whereby the lens holding member 1 moves downward (in the Z2 direction) against the biasing force of the upper leaf spring 5, as illustrated in FIG. 19.

In this manner, by changing the direction of electrical currents flowing through the coil 4, the lens holding member 1 can be operated in the optical axis direction LD. In the actual operation, a lens body, not illustrated, is fixed in the opening 1g, whereby the lens holding member 1 can be operated integrally with the lens body.

Effects of this embodiment are described below.

The lens driving apparatus 100 according to the embodiment includes a tubular lens holding member 1 that is capable of holding a lens body, a static member 2 including a housing 7 that accommodates the lens holding member 1 therein, a biasing member 30 that supports the lens holding member 1 so as to allow the lens holding member 1 to move in an optical axis direction, and a moving mechanism 50 that at least includes a magnet 3 and a coil 4 and moves the lens holding member 1 in the optical axis direction. The biasing member 30 includes an upper leaf spring 5, fixed to an upper portion of the lens holding member 1, and a lower leaf spring 6, fixed to a lower portion of the lens holding member 1. The upper leaf spring 5 includes a first portion (upper first portion) 5a fixed to the lens holding member 1, a second portion (upper second portion) 5b fixed to the static member 2, and an upper elastic arm portion 5c positioned between the upper first portion 5a and the upper second portion 5b. A through hole 5f is formed in the upper first portion 5a of the upper leaf spring 5. The lens holding member 1 includes a fastening portion 1d. The fastening portion 1d includes a mount surface 1a on which the upper leaf spring 5 is placed, a recess 1b that faces the through hole 5f and serves as an adhesive holding portion, and a protrusion 1c that protrudes from the recess 1b and is inserted into the through hole 5f. An adhesive GL held in the recess 1b surrounds the protrusion 1c and part of the adhesive GL spreads to an upper surface of the upper first portion 5a of the upper leaf spring 5 through the through hole 5f. The upper leaf spring 5 is fixed to the lens holding member 1 with the adhesive GL.

In this structure, the adhesive GL held in the recess 1b, serving as an adhesive holding portion, spreads to an upper surface of the upper first portion 5a of the upper leaf spring 5 through the through hole 5f. The upper leaf spring 5 can thus be fixed to the lens holding member 1 in such a manner as to be pressed from the upper surface with the adhesive GL. This structure minimizes the chance of separation of an adhesive between the upper leaf spring 5 and the lens holding member 1 regardless of an impact being exerted on the lens driving apparatus due to a fall or other causes. The fastening portion 1d of the lens holding member 1 includes the protrusion 1c, which is inserted into the through hole 5f. Thus, the protrusion 1c can hold the adhesive GL surrounding the protrusion 1c, whereby the adhesive GL easily spreads to a portion on the upper surface of the upper first portion 5a. This structure is thus effective in providing a lens driving apparatus that minimizes the chance of separation of an adhesive between an upper leaf spring and a lens holding member.

In the lens driving apparatus 100 according to the embodiment, bonding between each upper first portion 5a of the upper leaf spring 5 and the corresponding fastening portion 1d of the lens holding member 1 is performed in the state where the protrusions 1c are inserted into the through holes 5f. Thus, the adhesive GL easily moves along the protrusions 1c to spread to the upper surface of the upper first portion 5a.

In the lens driving apparatus 100 according to the embodiment, the adhesive holding portion is a recess 1b that is recessed with respect to the mount surface 1a. Part of the adhesive GL inserted into the recess 1b spreads to an upper surface of a portion of the upper first portion 5a (for example, a portion near the fringe portion 5e) and a lower surface of a portion of the upper first portion 5a, so that the upper leaf spring 5 is fixed to the lens holding member 1.

In this structure, the upper leaf spring 5 is bonded to the lens holding member 1 with part of the adhesive GL inserted in the recess 1b and part of the adhesive GL that has spread to the upper surface of the upper first portion 5a of the upper leaf spring 5 through the through hole 5f. Since the lower surface of the upper leaf spring 5, the inner surface of the through hole 5f, and the upper surface of the upper leaf spring 5 are held with the adhesive GL, the upper leaf spring 5 can be securely fixed to the lens holding member 1 with the adhesive. This structure is thus effective in providing a lens driving apparatus that minimizes the chance of separation of an adhesive between an upper leaf spring and a lens holding member regardless of an impact being exerted on the lens driving apparatus due to a fall or other causes.

In the lens driving apparatus 100 according to the embodiment, the through hole 5f is noncircular.

Compared to a circular through hole, the noncircular through hole 5f can increase an area over which the adhesive GL spreads to join the upper leaf spring 5 to the lens holding member 1. The noncircular through hole 5f thus can more firmly bond and fix the upper leaf spring 5 to the lens holding member 1.

In the lens driving apparatus 100 according to the embodiment, the through hole 5f has such a shape that a portion of the through hole 5f protrudes toward the inside of the opening of the through hole 5f. In the through hole 5f having such an opening shaped as above, when the portion protruding toward the inside of the opening (protrusion, below) is placed over the adhesive GL, part of the adhesive GL squeezed by the protrusion flows out from the sides of the protrusion toward the upper side of the protrusion, whereby the protrusion is easily covered with the adhesive GL. This structure thus increases the area over which the adhesive GL spreads to bond the upper leaf spring 5 to the lens holding member 1. Moreover, the existence of the adhesive GL that has spread to the upper surface of the upper first portion 5a of the upper leaf spring 5 through the through hole 5f facilitates joining the upper leaf spring 5 and the lens holding member 1 together in the state where the protrusion is being covered with the adhesive GL. Thus, the upper leaf spring 5 can be more firmly joined and fixed to the lens holding member 1.

In the lens driving apparatus 100 according to the embodiment, the lens holding member 1 includes a rising base portion 1e that includes the fastening portion 1d. A boundary between the upper first portion 5a and the upper elastic arm portion 5c of the upper leaf spring 5 is located at a position corresponding to an outer periphery of the base portion 1e.

In this structure, the boundary between the upper first portion 5a and the upper elastic arm portion 5c of the upper leaf spring 5 is located at a position corresponding to the outer periphery of the base portion 1e. This structure is more likely to prevent the upper elastic arm portion 5c from coming into contact with the base portion 1e when the upper elastic arm portion 5c is in operation, whereby the restriction on the operation of the upper elastic arm portion 5c is minimized. Thus, the upper elastic arm portion 5c can become fully operable. This structure thus enables production of the biasing force that varies to a lesser extent and is thus effective in providing a lens driving apparatus that operates stably.

In the lens driving apparatus 100 according to the embodiment, each recess 1b includes an extension portion 1f that extends toward the corresponding upper elastic arm portion 5c and each through hole 5f includes a fringe portion 5e that faces the corresponding extension portion 1f, and the adhesive GL inserted in the extension portion 1f spreads to a portion of an upper surface of the upper first portion 5a and a portion of a lower surface of the upper first portion 5a, the portions extending along the fringe portion 5e.

In this structure, each recess 1b includes an extension portion 1f and each through hole 5f includes a fringe portion 5e that faces the corresponding extension portion 1f. When the fringe portion 5e is disposed so as to overlap part of the extension portion 1f filled with the adhesive GL, part of the adhesive GL squeezed by the upper first portion 5a located near the fringe portion 5e easily flows out to a portion of the upper surface of the upper first portion 5a including the fringe portion 5e. In addition, the provision of the fringe portion 5e facing the extension portion 1f can increase the area over which the adhesive GL spreads to bond the upper leaf spring 5 to the lens holding member 1. Specifically, the upper first portion 5a can increase an area over which the adhesive GL spreads to bond the upper leaf spring 5 to the lens holding member 1 and the upper surface and the lower surface of the upper first portion 5a are held with the adhesive GL. Thus, the end portions of the upper first portions 5a can be securely joined to the fastening portions 1d of the lens holding member 1 and the base portions of the upper elastic arm portion 5c are fixed.

This structure prevents the upper first portions 5a from rising in accordance with the operation of the upper elastic arm portions 5c, whereby the biasing force can be prevented from varying due to the rise of the upper first portions 5a. This structure thus enables production of a biasing force that varies to a lesser extent and is effective in providing a lens driving apparatus that operates more stably.

In the lens driving apparatus 100 according to the embodiment, in an initial state where an electrical current is not caused to pass through the coil 4, the upper leaf spring 5 biases the lens holding member 1 upward whereas the lower leaf spring 6 biases the lens holding member 1 downward.

In this structure, in the initial state, the lens holding member 1 is held at a position at which a biasing force of the upper leaf spring 5 and a biasing force of the lower leaf spring 6 are in balance. Since the lens holding member 1 is held in this manner, the lens holding member 1 is movable in positive and negative optical axis directions from the position at which the lens holding member 1 is held in the initial state. Thus, when images are taken using an electronic device including the lens driving apparatus 100, the device can focus on a subject by moving the lens holding member 1 by a minimum amount from the initial state.

In the lens driving apparatus 100 according to the embodiment, the adhesive GL with which the upper first portion 5a is bonded to the mount surface 1a (fastening portion 1d, see FIGS. 4A and 4B) of the lens holding member 1 is disposed at a portion that is open upward through the indentation 7g.

This structure allows the adhesive GL, which is an ultraviolet curing adhesive, to cure by being easily irradiated with ultraviolet rays during assembly. This structure is also effective in allowing the amount of the applied adhesive GL to be easily checked and in, if the amount of the applied adhesive GL has been found insufficient after being checked, adding the adhesive GL.

As described above, the lens driving apparatus according to the embodiment of the present invention has been specifically described. The present invention, however, is not limited to the above-described embodiment and can be embodied in various manners without departing from the gist of the invention. For example, the present invention can be embodied in modifications described below, which also belong to the technical scope of the present invention.

Modified Example 1

In the lens driving apparatus 100 according to the first embodiment, the upper leaf spring 5 biases the lens holding member 1 upward and the lower leaf springs 6 bias the lens holding member 1 downward, so that, in the initial state, the lens holding member 1 is disposed at a position at which the biasing force of the upper leaf spring 5 and the biasing force of the lower leaf springs 6 are in balance. However, the upper leaf spring 5 and the lower leaf springs 6 may bias the lens holding member 1 downward so that, in the initial state, the lens holding member 1 is held in the state of being in contact with the base member 8. Alternatively, the upper leaf spring 5 and the lower leaf springs 6 may bias the lens holding member 1 upward.

Modified Example 2

In the first embodiment, the moving mechanism 50 is constituted of the magnets 3, the coil 4, and the housing 7 serving as a yoke. However, the moving mechanism 50 may be constituted of the magnets 3 and the coil 4.

Modified Example 3

In the first embodiment, the adhesive GL is an ultraviolet curing adhesive. The adhesive GL, however, may be other adhesives (for example, a thermoset adhesive or an ultraviolet cure/thermosetting adhesive) besides an ultraviolet curing adhesive.

Modified Example 4

In the first embodiment, an adhesive holding portion that faces the through hole 5f of the upper leaf spring 5 is formed of the recess 1b that is recessed with respect to the mount surface 1a. However, besides a recess, the adhesive holding portion may be a surface flush with the mount surface 1a.

What is claimed is:

1. A lens driving apparatus, comprising:
   a tubular lens holding member capable of holding a lens body;
   a fixed member including a housing that accommodates the lens holding member therein;
   a biasing member that movably supports the lens holding member such that the lens holding member moves in an optical axis direction, the biasing member including:
      an upper leaf spring, including:
         a first portion having a through hole and fixed to an upper portion of the lens holding member;
         a second portion fixed to the fixed member; and
         an elastic arm portion provided between the first portion and the second portion; and
      a lower leaf spring fixed to a lower portion of the lens holding member; and
   a moving mechanism configured to move the lens holding member in the optical axis direction, the moving mechanism including at least a magnet and a coil,
   wherein the lens holding member includes:
      a fastening portion having:
         a mount surface on which the upper leaf spring is placed;
         an adhesive holding portion that faces the through hole of the first portion of the upper leaf spring, the adhesive holding portion including a recess that is recessed from the mount surface;
         a protrusion that protrudes from the adhesive holding portion and is inserted into the through hole; and
         an adhesive held in the adhesive holding portion so as to fill the recess and surround the protrusion, part of the adhesive spreading through the through hole so as to cover an upper surface of the first portion, the adhesive being disposed over and under a portion of the first portion, thereby fixing the upper leaf spring to the lens holding member.

2. The lens driving apparatus according to claim 1, wherein the through hole has a noncircular shape.

3. The lens driving apparatus according to claim 1, wherein the lens holding member further includes:
   a rising base portion having the fastening portion, and wherein a boundary between the first portion and the elastic arm portion of the upper leaf spring is located at a position corresponding to an outer periphery of the base portion.

4. The lens driving apparatus according to claim 1, wherein the protrusion protrudes from a bottom of the recess.

5. The lens driving apparatus according to claim 4, wherein the through hole has a noncircular shape.

6. The lens driving apparatus according to claim 4, wherein the lens holding member further includes:
   a rising base portion having the fastening portion, and wherein a boundary between the first portion and the elastic arm portion of the upper leaf spring is located at a position corresponding to an outer periphery of the base portion.

7. The lens driving apparatus according to claim 4, wherein:
   the recess includes an extension portion that extends toward the elastic arm portion;
   the through hole includes a fringe portion that faces the extension portion; and the adhesive filling the extension portion is disposed over and under a portion of the first portion extending along the fringe portion.

8. The lens driving apparatus according to claim 6 wherein:

the recess includes an extension portion that extends toward the elastic arm portion;

the through hole includes a fringe portion that faces the extension portion; and the adhesive filling the extension portion is disposed over and under a portion of the first portion extending along the fringe portion.

9. The lens driving apparatus according to claim 5, wherein, in an initial state of the lens driving apparatus in which no electrical current passes through the coil, the upper leaf spring biases the lens holding member upward while the lower leaf spring biases the lens holding member downward.

10. The lens driving apparatus according to claim 7, wherein, in an initial state of the lens driving apparatus in which no electrical current passes through the coil, the upper leaf spring biases the lens holding member upward while the lower leaf spring biases the lens holding member downward.

11. The lens driving apparatus according to claim 8, wherein, in an initial state of the lens driving apparatus in which no electrical current passes through the coil, the upper leaf spring biases the lens holding member upward while the lower leaf spring biases the lens holding member downward.

12. The lens driving apparatus according to claim 1, wherein a fringe portion of the through hole does not touch the protrusion.

\* \* \* \* \*